US012770372B2

(12) United States Patent

Aidt et al.

(10) Patent No.: US 12,770,372 B2

(45) Date of Patent: Oct. 20, 2026

(54) DIGITAL ANALYSIS OF PREANALYTICAL FACTORS IN TISSUES USED FOR HISTOLOGICAL STAINING

(71) Applicant: Agilent Technologies, Inc., Santa Clara, CA (US)

(72) Inventors: Frederik Aidt, Copenhagen (DK); Oded Ben-David, Shoham (IL); Lars Christian Jacobsen, Birkerod (DK)

(73) Assignee: Agilent Technologies, Inc., Santa Clara, CA (US)

( * ) Notice: Subject to any disclaimer, the term of this patent is extended or adjusted under 35 U.S.C. 154(b) by 589 days.

(21) Appl. No.: 17/993,010

(22) Filed: Nov. 23, 2022

(65) Prior Publication Data

US 2023/0162485 A1 May 25, 2023

Related U.S. Application Data

(60) Provisional application No. 63/282,249, filed on Nov. 23, 2021.

(51) Int. Cl.

*G16H 10/60* (2018.01)
*G06T 7/00* (2017.01)

(Continued)

(52) U.S. Cl.

CPC .......... *G06V 10/774* (2022.01); *G06T 7/0012* (2013.01); *G06T 7/10* (2017.01);

(Continued)

(58) Field of Classification Search

CPC .. G06V 10/774; G06V 10/764; G06V 10/771; G06V 2201/10; G06V 10/22;

(Continued)

(56) References Cited

U.S. PATENT DOCUMENTS

| | | | |
|---|---|---|---|
| 10,706,535 B2 | 7/2020 | Arar et al. | |
| 2017/0161545 A1* | 6/2017 | Champlin | ............ G06V 20/695 |

(Continued)

FOREIGN PATENT DOCUMENTS

| | | |
|---|---|---|
| CN | 110852288 | 2/2020 |
| JP | 2008-185337 A | 8/2008 |

(Continued)

OTHER PUBLICATIONS

Singh, A., Sengupta, S., & Lakshminarayanan, V. (2020). Explainable deep learning models in medical image analysis. Journal of imaging, 6(6), 52. (Year: 2020).*

(Continued)

*Primary Examiner* — Oneal R Mistry
*Assistant Examiner* — Rachel L Roberts
(74) *Attorney, Agent, or Firm* — ArentFox Schiff LLP

(57) ABSTRACT

There is provided a computer implemented method of training a preanalytical factor machine learning model, comprising: creating a preanalytical training dataset of a plurality of records, wherein a preanalytical record comprises: an image of a slide of pathological tissue of a subject processed with at least one preanalytical factor, and a ground truth label indicating the at least one preanalytical factor, and training the preanalytical machine learning model on the preanalytical training dataset for generating an outcome of at least one target preanalytical factor used to process tissue depicted in a target image in response to the input of the target image.

22 Claims, 7 Drawing Sheets

(51) Int. Cl.
*G06T 7/10* (2017.01)
*G06V 10/764* (2022.01)
*G06V 10/771* (2022.01)
*G06V 10/774* (2022.01)
*G16H 15/00* (2018.01)

(52) U.S. Cl.
CPC .......... *G06V 10/764* (2022.01); *G06V 10/771* (2022.01); *G06T 2207/10024* (2013.01); *G06T 2207/20081* (2013.01); *G06T 2207/30024* (2013.01)

(58) Field of Classification Search
CPC ............. G06V 10/454; G06V 10/7753; G06V 2201/03; G06V 10/82; G06T 7/0012; G06T 7/10; G06T 2207/10024; G06T 2207/20081; G06T 2207/30024; G06T 2207/10056; G06T 2207/20084; G06N 3/0455; G06N 3/0475; G06N 20/00; G06N 3/045; G06N 3/0464; G06N 3/08; G16H 30/40; G16H 50/20
See application file for complete search history.

(56) References Cited

U.S. PATENT DOCUMENTS

| | | | | |
|---|---|---|---|---|
| 2019/0266486 | A1 | 8/2019 | Yamada et al. | |
| 2020/0082222 | A1 | 3/2020 | Cohen et al. | |
| 2020/0258223 | A1 | 8/2020 | Yip et al. | |
| 2020/0388029 | A1* | 12/2020 | Saltz | G06V 10/267 |
| 2021/0005308 | A1* | 1/2021 | Klaiman | G06T 7/0012 |
| 2021/0209760 | A1 | 7/2021 | Sue et al. | |
| 2021/0241178 | A1* | 8/2021 | Madabhushi | G06N 3/045 |

FOREIGN PATENT DOCUMENTS

| | | | | |
|---|---|---|---|---|
| WO | WO-2010066252 | A1 * | 6/2010 | G01N 1/31 |
| WO | 2017/072320 | A1 | 5/2017 | |
| WO | WO-2019026081 | A2 * | 2/2019 | G06N 3/08 |
| WO | WO 2020/210733 | | 10/2020 | |
| WO | 2021/037872 | A1 | 3/2021 | |
| WO | WO-2021037875 | A1 * | 3/2021 | G01N 33/4833 |

OTHER PUBLICATIONS

Extended European Search Report received for Patent Application No. 22898053.8, mailed on Aug. 26, 2025, 11 pages.
Lerch et al., "Monitoring Dehydration and Clearing in Tissue Processing for High-Quality Clinical Pathology", Biopreservation and Biobanking, vol. 17, No., 04, Aug. 2019. pp. 303-311.
Colley et al. "Fixation and Other Pre-Analytical Factors", Immunohistochemical Staining Methods, IHC Guidebook, Agilent, 6th Edition, Part I: The Staining Process, Chap.2: 20-29, Sep. 6, 1921.
Bandi et al. "From Detection of Individual Metastases to Classification of Lymph Node Status at the Patient Level: the CAMELYON17 Challenge", IEEE Transactions on Medical Imaging,38(2):550-560, Aug. 27, 2018.
Bauer et al. "A New Paradigm for Tissue Diagnostics: Tools and Techniques to Standardize Tissue Collection, Transport, and Fixation", Current Pathobiology Reports, 6:135-143, Apr. 25, 2018.
Colley et al. "Fixation and Other Pre-Analytical Factors", in Immunohistochemical Staining Methods, IHC Guidebook, chapter 2, 6th Edition, Dako Denmark A/S, An Agilent Technologies Company, Sep. 6, 1921. (Part 1).
Colley et al. "Fixation and Other Pre-Analytical Factors", in Immunohistochemical Staining Methods, IHC Guidebook, chapter 2, 6th Edition, Dako Denmark A/S, An Agilent Technologies Company, Sep. 6, 1921. (Part 2).
Engel et al. "Effects of Preanalytical Variables on the Detection of Proteins by Immunohistochemistry in Formalin-Fixed, Paraffin-Embedded Tissue", Archives of Pathology & Laboratory Medicine, 135(5):537-543, May 2011.
Lanng et al. "Quality Assessment of Ki67 Staining Using Cell Line Proliferation Index and Stain Intensity Features", Cytometry, 95(4):381-388, Dec. 17, 2018.
International Search Report and the Written Opinion Dated Mar. 15, 2023 From the International Searching Authority Re. Application No. PCT/IB2022/061331 (14 Pages).

* cited by examiner

404

402

DIGITAL ANALYSIS OF PREANALYTICAL FACTORS IN TISSUES USED FOR HISTOLOGICAL STAINING

RELATED APPLICATION(S)

This application claims the benefit of priority under 35 USC § 119(e) of U.S. Provisional Patent Application No. 63/282,249 filed on Nov. 23, 2021, the contents of which are all incorporated by reference as if fully set forth herein in their entirety.

BACKGROUND

The present invention, in some embodiments thereof, relates to preanalytical factors and, more specifically, but not exclusively, to systems and methods for estimation of preanalytical factors in tissues used for histological staining.

Preanalytical factors (also referred to as preanalytical variables) include fixation and processing variables that may impact the process of tissue formalin fixation and paraffin embedding for tissue preservation and histological staining.

SUMMARY

According to a first aspect, a computer implemented method for training a preanalytical factor machine learning model, comprises: creating a preanalytical training dataset of a plurality of records, wherein a preanalytical record comprises: an image of a slide of pathological tissue of a subject processed with at least one preanalytical factor, and a ground truth label indicating the at least one preanalytical factor, and training the preanalytical machine learning model on the preanalytical training dataset for generating an outcome of at least one target preanalytical factor used to process tissue depicted in a target image in response to the input of the target image.

According to a second aspect, a computer implemented method for obtaining at least one preanalytical factor of a target image of a slide of pathological tissue of a subject, comprises: feeding the target image into a preanalytical machine learning model, wherein the preanalytical machine learning model is trained on a preanalytical training dataset of a plurality of records, where a preanalytical record comprises: an image of a slide of pathological tissue of a subject processed with at least one preanalytical factor, and a ground truth label indicating the at least one preanalytical factor, and obtaining an outcome of at least one target preanalytical factor used to process the pathological tissue depicted in the target image.

According to a third aspect, a device for training a preanalytical factor machine learning model, comprises: at least one hardware processor executing a code for: creating a preanalytical training dataset of a plurality of records, wherein a preanalytical record comprises: an image of a slide of pathological tissue of a subject processed with at least one preanalytical factor, and a ground truth label indicating the at least one preanalytical factor, and training the preanalytical machine learning model on the preanalytical training dataset for generating an outcome of at least one target preanalytical factor used to process tissue depicted in a target image in response to the input of the target image.

According to a fourth aspect, a device for obtaining at least one preanalytical factor of a target image of a slide of pathological tissue of a subject, comprises: at least one hardware processor executing a code for: feeding the target image into a preanalytical machine learning model, wherein the preanalytical machine learning model is trained on a preanalytical training dataset of a plurality of records, where a preanalytical record comprises: an image of a slide of pathological tissue of a subject processed with at least one preanalytical factor, and a ground truth label indicating the at least one preanalytical factor, and obtaining an outcome of at least one target preanalytical factor used to process the pathological tissue depicted in the target image.

In a further implementation form of the first, second, third, and fourth aspects, further comprising: creating a secondary training dataset of a plurality of records, wherein a secondary record comprises: the image of the slide of pathological tissue of the subject processed with the at least one preanalytical factor, the at least one preanalytical factor, and a ground truth label indicating a secondary indication, and training a secondary machine learning model on the secondary training dataset for generating an outcome of a target secondary indication in response to an input of a target image and at least one target preanalytical factor used to process tissue depicted in the target image.

In a further implementation form of the first, second, third, and fourth aspects, the secondary training dataset comprises a clinical indications training dataset, the secondary indication comprises a clinical indication, and the secondary machine learning model comprises a clinical machine learning model.

In a further implementation form of the first, second, third, and fourth aspects, the clinical indication is selected from a group including: a clinical score, a medical condition, and a pathological report.

In a further implementation form of the first, second, third, and fourth aspects, further comprising treating the subject with a treatment effective for the medical condition, according to the clinical score, and/or according to the pathological report.

In a further implementation form of the first, second, third, and fourth aspects, the ground truth label is selected from a group consisting of: a tag, metadata, an image, and a segmentation outcome of a segmentation model fed the image.

In a further implementation form of the first, second, third, and fourth aspects, the input of the at least one preanalytical factor fed into the secondary machine learning model is obtained as the outcome of the preanalytical machine learning model fed the target image.

In a further implementation form of the first, second, third, and fourth aspects, the preanalytical machine learning model and the secondary machine learning model are jointly trained using at least common images and common labels of preanalytical factors.

In a further implementation form of the first, second, third, and fourth aspects, the at least one preanalytical factor of the secondary record comprises at least one feature map extracted from a hidden layer of the preanalytical machine learning model fed the image of the slide of pathological tissue of the subject processed with the at least one preanalytical factor, and wherein the secondary machine learning model generates the outcome of the target secondary indication in response to an input of the target image and a target feature map extracted from a hidden layer of the preanalytical machine learning model fed the target image.

In a further implementation form of the first, second, third, and fourth aspects, further comprising: creating an image translation training dataset, comprising two or more sets of image translation records, wherein a source image translation record of a source set of image translation records comprises: a source image of the slide of pathological tissue of the subject processed with the at least one preanalytical factor, and a ground truth indicating a source label, wherein a destination image translation record of a destination set of image translation records comprises: a destination image of the slide of pathological tissue of the subject processed with the at least one preanalytical factor, and a ground truth indicating a destination label, and training an image translation machine learning model on the image translation training dataset for converting a target source image of a slide of pathological tissue of the source set of image translation records to an outcome destination of a slide of pathological tissue of the destination set of image translation records.

In a further implementation form of the first, second, third, and fourth aspects, the source label indicates pathological tissue abnormally processed with the at least one preanalytical factor, and the destination label indicates pathological tissue normally processed with the at least one preanalytical factor.

In a further implementation form of the first, second, third, and fourth aspects, the target source image comprises an input image and additional metadata indicating a source preanalytical factor that has been abnormally processed, and metadata indicating a destination preanalytical factor that has been normally processed.

In a further implementation form of the first, second, third, and fourth aspects, the target source image comprises an input image and further comprising providing a reference image from the destination set used to infer the destination of the input image.

In a further implementation form of the first, second, third, and fourth aspects, the source set is selected according to an input of the at least one preanalytical factor obtained as the outcome of the preanalytical machine learning model fed the target image.

In a further implementation form of the first, second, third, and fourth aspects, further comprising: creating an image correction training dataset of a plurality of records, wherein an image correction record comprises: the image of the slide of pathological tissue of the subject processed with the at least one preanalytical factor, wherein the at least one preanalytical factor is classified as abnormal, wherein the image of the slide depicts abnormally processed pathological tissue, the at least one preanalytical factor, and a ground truth label indicating a normal image of a slide of pathological tissue processed with at least one preanalytical factor classified as normal, and training an image correction machine learning model on the image correction training dataset for generating an outcome of a synthesized corrected image of a slide of pathological tissue that simulates what a target image of the slide would look like when processed with the at least one preanalytical factor classified as normal, in response to the target image of the slide processed with at least one target preanalytical factor classified as abnormal.

In a further implementation form of the first, second, third, and fourth aspects, the input of the at least one preanalytical factor fed into the image correction machine learning model is obtained as the outcome of the preanalytical machine learning model fed the target image.

In a further implementation form of the first, second, third, and fourth aspects, the image correction machine learning model and the preanalytical machine learning model are jointly trained using common images and common ground truth labels of preanalytical factors.

In a further implementation form of the first, second, third, and fourth aspects, further comprising training a baseline model using a self-supervised and/or unsupervised approach on an unlabeled training dataset of a plurality of unlabeled images of pathological tissues of a subject processed with at least one preanalytical factors, and wherein training comprises further training the baseline model on the preanalytical training dataset for creating the preanalytical machine learning model.

In a further implementation form of the first, second, third, and fourth aspects, the ground truth label indicating the at least one preanalytical factor comprises a ground truth label indicating correctly applied preanalytical factors or anomalous application of preanalytical factors, wherein training comprises training an implementation of the preanalytical machine learning model for learning a distribution of inlier images labelled as correctly applied preanalytical factors for detecting an image as an outlier indicating incorrectly applied preanalytical factors.

In a further implementation form of the first, second, third, and fourth aspects, further comprising extracting features from the image using a pretrained feature extractor, wherein the preanalytical record includes the extracted features, wherein the pretrained feature extractor is applied to the target image to obtain extracted target features fed into the preanalytical machine learning model.

In a further implementation form of the first, second, third, and fourth aspects, the pretrained feature extractor is implemented as a neural network, wherein the extracted features are obtained from at least one feature map before a classification layer of the neural network when the neural network is fed the target image.

In a further implementation form of the first, second, third, and fourth aspects, the neural network is an image classifier trained on an image training dataset of non-tissue images labelled with ground truth classification categories.

In a further implementation form of the first, second, third, and fourth aspects, the neural network is a nuclear segmentation network trained on a segmentation training dataset of images of slides of pathological tissues labelled with ground truth segmentations of nuclei.

In a further implementation form of the first, second, third, and fourth aspects, further comprising extracting a plurality of patches from the image, wherein extracting features comprises extracting features from the plurality of patches.

In a further implementation form of the first, second, third, and fourth aspects, further comprising, for each patch, reducing the extracted features extracted from the patch to a feature vector using a global max pooling layer and/or a global average pooling layer, wherein the preanalytical record includes the feature vector, wherein the preanalytical machine learning generates the outcome of at least one target preanalytical factor in response to the input of feature vectors computed for features extracted from patches of the target image.

In a further implementation form of the first, second, third, and fourth aspects, further comprising, for each preanalytical record, feeding the image into a nuclear segmentation machine learning model to obtain an outcome of a segmentation of nuclei in the image, creating a mask that masks out pixels external to the segmentation of the nuclei based on the outcome of the segmentation, and applying the mask to the image to create a masked image, wherein the image of the preanalytical record comprises the masked image, and wherein a target masked image created from the target image is fed into the preanalytical machine learning model trained on the preanalytical training dataset.

In a further implementation form of the first, second, third, and fourth aspects, further comprising, for each preanalytical record, feeding the image into a nuclear segmentation machine learning model to obtain an outcome of a segmentation of nuclei in the image, and cropping a boundary around each segmentation to create single-nucleus patches, wherein the image of the preanalytical record comprises a plurality of single-nucleus patches, and wherein a target segmentation of nuclei created from the target image is fed into the preanalytical machine learning model trained on the preanalytical training dataset.

In a further implementation form of the first, second, third, and fourth aspects, further comprising, for each preanalytical record, converting a color version of the image to a gray-scale version of the image, and wherein a target gray-scale version of the target image is fed into the preanalytical machine learning model trained on the preanalytical training dataset.

In a further implementation form of the first, second, third, and fourth aspects, further comprising, for each preanalytical record, feeding the image into a red blood cell (RBC) segmentation machine learning model to obtain an outcome of a segmentation of (RBC) in the image and/or patches that depict RBCs, wherein the image of the preanalytical record comprises the segmentations of RBC and/or patches that depict RBCs, and wherein a target segmentation of RBC and/or patches that depict RBC from the target image is fed into the preanalytical machine learning model trained on the preanalytical training dataset.

In a further implementation form of the first, second, third, and fourth aspects, the preanalytical machine learning model is pre-trained on another image training dataset comprising a plurality of images each labeled with a respective ground truth indication of a certain classification category, and wherein the pre-trained preanalytical training dataset is further trained on the preanalytical training dataset.

In a further implementation form of the first, second, third, and fourth aspects, the preanalytical record further comprises metadata indicating at least one known preanalytical factor, and wherein the ground truth label is for at least one unknown preanalytical factor, wherein at least one known preanalytical factor associated with the target image is further fed into the preanalytical machine learning model trained on the preanalytical training dataset.

In a further implementation form of the first, second, third, and fourth aspects, further comprising training an interpretability machine learning model to generate an interpretability map indicating relative significance of pixels of the target image to obtaining the at least one target preanalytical factor, wherein the target image is at low resolution, and further comprising sampling a plurality of high resolution patches of the target image, and feeding the plurality of high resolution patches into the preanalytical machine learning model to obtain the at least one target preanalytical factor.

In a further implementation form of the first, second, third, and fourth aspects, the at least one preanalytical factor comprises fixation time.

In a further implementation form of the first, second, third, and fourth aspects, the at least one preanalytical factor comprises tissue thickness obtained by sectioning of the FFPE block.

In a further implementation form of the first, second, third, and fourth aspects, the at least one preanalytical factor is selected from a group consisting of: fixative type, warm ischemic time, cold ischemic time, duration and delay of temperature during prefixation, fixative formula, fixative concentration, fixative pH, fixative age of reagent, fixative preparation source, tissue to fixative volume ratio, method of fixation, conditions of primary and secondary fixation, postfixation washing conditions and duration, postfixation storage reagent and duration, type of processor, frequency of servicing and reagent replacement, tissue to reagent volume ratio, number of position of co-processed specimens, dehydration and clearing reagent, dehydration and clearing temperature, dehydration and clearing number of changes, dehydration clearing duration, baking time, and temperature.

In a further implementation form of the first, second, third, and fourth aspects, the at least one preanalytical factor is an indication of a quality of a stain of the pathological tissue of the slide.

In a further implementation form of the first, second, third, and fourth aspects, the stain is selected from a group consisting of: Immunohistochemical (IHC) stains, in situ hybridization (ISH) stains, fluorescence ISH (FISH), chromogenic ISH (CISH), silver ISH (SISH), hematoxylin and eosin (H&E), Hematoxylin, Acridine orange, Bismarck brown, Carmine, Coomassie blue, Cresyl violet, Crystal violet, 4',6-diamidino-2-phenylindole ("DAPI"), Eosin, Ethidium bromide intercalates, Acid fuchsine, Hoechst stain, Iodine, Malachite green, Methyl green, Methylene blue, Neutral red, Nile blue, Nile red, Osmium tetroxide, Propidium Iodide, Rhodamine, Safranine, antibody-based stain, or label-free imaging marker obtained using imaging approaches including Raman spectroscopy, near infrared ("NIR") spectroscopy, autofluorescence imaging, and phase imaging, that highlight features of interest without an external dye.

In a further implementation form of the first, second, third, and fourth aspects, the slide includes Formalin-fixed paraffin-embedded (FFPE) tissue.

In a further implementation form of the first, second, third, and fourth aspects, further comprising: feeding the target image and the at least one target preanalytical factor into a secondary machine learning model, wherein the secondary machine learning model is trained on a secondary indication training dataset of a plurality of records, wherein a secondary indication record comprises: the image of the slide of pathological tissue of the subject processed with the at least one preanalytical factor, the at least one preanalytical factor, and a ground truth label indicating the secondary indication, and obtaining an outcome of a target secondary indication.

In a further implementation form of the first, second, third, and fourth aspects, further comprising: in response to classifying the at least one target preanalytical factor as abnormal, feeding the target image and the at least one target preanalytical factor into an image correction machine learning model, wherein the image correction machine learning model is trained on a corrected image training dataset of a plurality of records, wherein an image correction record comprises: the image of the slide of pathological tissue of the subject processed with the at least one preanalytical factor, wherein the at least one preanalytical factor is classified as abnormal, wherein the image of the slide depicts abnormally processed pathological tissue, the at least one preanalytical factor, and a ground truth label indicating a normal image of a slide of pathological tissue processed with at least one preanalytical factor classified as normal, and obtaining an outcome of a corrected image that simulates what the target image of the slide would look like when processed with the at least one preanalytical factor classified as normal.

In a further implementation form of the first, second, third, and fourth aspects, further comprising: in response to classifying the at least one target preanalytical factor as abnormal, feeding the target image and the at least one target preanalytical factor into an image translation machine learning model, wherein the image translation machine learning model is trained on an image translation training dataset, comprising two or more sets of image translation records, wherein a source image translation record of a source set of image translation records comprises: a source image of the slide of pathological tissue of the subject processed with the at least one preanalytical factor, and a ground truth indicating a source label, wherein a destination image translation record of a destination set of image translation records comprises: a destination image of the slide of pathological tissue of the subject processed with the at least one preanalytical factor, and a ground truth indicating a destination label, and obtaining an outcome destination image of a slide of pathological tissue of the destination set of image translation records that is a conversion of the abnormally processed target image into a normally processed image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
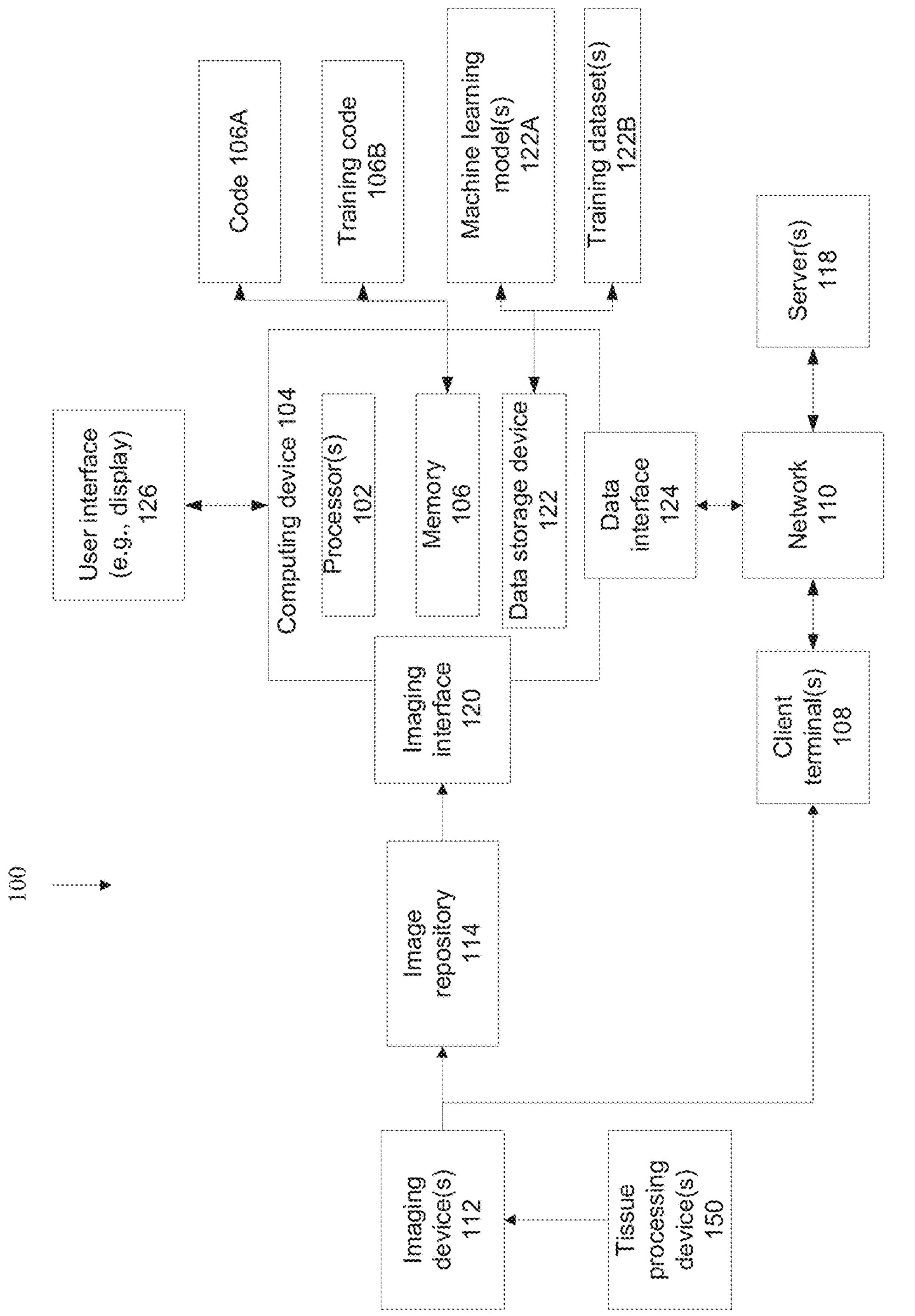
FIG. 1 is block a diagram of components of a system for training ML model(s) for generating an indication of preanalytical factor(s) used to process tissue depicted in a target image in response to the input of the target image and/or using the ML model(s) to obtain the indication of preanalytical factor(s) in response to an input of target image(s) depicting tissue sample(s), in accordance with some embodiments of the present invention.

The present invention, in some embodiments thereof, relates to preanalytical factors and, more specifically, but not exclusively, to systems and methods for estimation of preanalytical factors in tissues used for histological staining.

An aspect of some embodiments of the present invention relates to systems, methods, a computing device, and/or code instructions (stored on a memory and executable by one or more hardware processors) for training a preanalytical factor machine learning model. A preanalytical training dataset of multiple records is created. A preanalytical record includes an image of a slide of pathological tissue of a subject processed with preanalytical factor(s), and a ground truth label indicating the preanalytical factor(s). The preanalytical machine learning model is trained on the preanalytical training dataset for generating an outcome of target preanalytical factor(s) used to process tissue depicted in a target image in response to the input of the target image.

An aspect of some embodiments of the present invention relates to systems, methods, a computing device, and/or code instructions (stored on a memory and executable by one or more hardware processors) for obtaining preanalytical factor(s) of a target image of a slide of pathological tissue of a subject. The target image is fed into the preanalytical machine learning model. An outcome of target preanalytical factor(s) used to process the target image is obtained from the preanalytical machine learning model.

Optionally, the target preanalytical factor(s) obtained as an outcome from the preanalytical machine learning model is fed in combination with the target image into a secondary machine learning model. An outcome of a target secondary indication is obtained as an outcome of the secondary machine learning model. The secondary machine learning model may be trained on a secondary indication training dataset that includes multiple records. A secondary indication record includes the image of the slide of pathological tissue of the subject processed with the preanalytical factor (s), an indication of the preanalytical factor(s), and a ground truth label indicating the secondary indication, for example, a tag, metadata, an image, and a segmentation outcome of a segmentation model fed the image. The secondary training dataset may be implemented as a clinical indications training dataset, the secondary indication may be implemented as a clinical indication, and the secondary machine learning model may be implemented as a clinical machine learning model.

Optionally, when the target preanalytical factor(s) obtained as an outcome from the preanalytical machine learning model is determined to be abnormal, for example, outside of a range and/or threshold indicating correct values for the target preanalytical factor(s), the target image and the target preanalytical factor(s) are fed into an image correction machine learning model. An outcome of a corrected image that simulates what the target image of the slide would look like when processed with the preanalytical factor(s) classified as normal is obtained as an outcome of the image correction machine learning model. The image correction machine learning model is trained on an image correction training dataset of multiple records. An image correction record includes the image of the slide of pathological tissue of the subject processed with the preanalytical factor(s) where the preanalytical factor(s) is classified as abnormal and where the image of the slide depicts abnormally processed pathological tissue, an indication of the preanalytical factor(s), and a ground truth label indicating a normal image of a slide of pathological tissue processed with preanalytical factor(s) classified as normal.

Alternatively or additionally, when the target preanalytical factor(s) obtained as an outcome from the preanalytical machine learning model is determined to be abnormal, a heatmap (e.g., as described herein) and/or score (e.g., probability of being abnormal) may be presented on a display. The user may view the heatmap and/or score to help determine how to interpret the image, and/or whether the image should be discarded.

At least some implementations of the systems, methods, apparatus (e.g., computing device), and/or code instructions (e.g., stored on a data storage device and executable by one or more hardware processors) described herein address the technical problem of determining preanalytical factors of processing tissues depicted in an image, for example, a whole slide image of pathological tissue. At least some implementations of the systems, methods, apparatus, and/or code instructions described herein improve the technical field and/or medical field of analysis of tissue samples, by determining preanalytical factors used to process tissues from images depicting those tissue samples. At least some implementations of the systems, methods, apparatus, and/or code instructions described herein improve the technical field of machine learning, by providing a machine learning model(s) that generates an outcome of preanalytical factor(s) in response to an input of an image of a tissue sample.

Processed tissue, for example, formalin-fixed, paraffin-embedded (FFPE) tissue specimens stained using an immunohistochemistry (IHC) approach, are routinely analyzed by pathologists within clinical- and research laboratories worldwide. However, the quality of the final IHC stain depends on multiple pre-analytical factors, for example, tissue fixation, processing variables, assay effectiveness, and others described herein. Stain quality may refer to both the stain intensity of the primary and counter staining and/or appearance of the tissue structures within the tissue sample. The stain quality is mainly affected by how many of the finite tissue antigens that are preserved in a tissue sample through the pre-analytical workflow, for example, as described with reference to K. B. Engel and H. M. Moore, "*Effects of preanalytical variables on the detection of proteins by immunohistochemistry in formalin-fixed, paraffin-embedded tissue", Arch Pathol Lab Med.* 2011; 135(5); 537-43 (hereinafter "Engel"), and/or D. R. Bauer, M. Otter, and D. R Chafin, "*A New Paradigm for Tissue Diagnostics: Tools and Techniques to Standardize Tissue Collection, Transport, and Fixation", Current pathobiology reports,* 2018; Vol. 6; 135-143 (hereinafter "Bauer"), incorporated herein by reference in their entirety.

The pre-analytical stage begins as soon as a piece of tissue is removed from the blood supply as tissue degeneration, caused by autolysis within cells, begins. Therefore, fixatives are used to preserve the tissue structures and as much of the antigens as possible. The stain quality mainly depends on over/underfixation of the tissue samples, for example, underfixed tissue samples will exhibit weak staining signal in IHC stains, for example, as described by Bauer. The tissue degeneration can be further accelerated by increased temperatures in the surrounding environment, making time to fixation a critical parameter to obtain a good staining quality. Poor fixation can also cause morphological tissue changes, which may remove important tissue information that could be used in manual or automated cancer diagnoses. No standard pre-analytic workflow exists, and it is not known how each parameter can affect the final stain quality, for example, as described by Bauer. The lack of standardization causes marked differences in the staining protocols both within and among institutions, for example, as described by Engel and/or Lanng, M. et al. "*Quality assessment of Ki67 staining using cell line proliferation index and stain intensity features", 2019, Cytometry. Part A: the journal of the International Society for Analytical Cytology.* 95, 4, s. 381-388 (hereinafter "Lanng"), incorporated herein by reference in their entirety.

The ML models described herein, which provide objective and/or reproducible approaches for determining preanalytical factors used in processing tissue depicted in images, may be used to standardize the pre-analytical tissue collection workflow, evaluate stain quality of newly developed staining protocols, and/or improving disease (e.g., cancer) diagnosis and/or treatments. For example, after following a protocol, an image of the tissue may be fed into the ML model(s) to determine whether the preanalytical factors used for processing the tissue falls within the correct range (or above/under a threshold) or is abnormal (e.g., outside the correct range and/or above/under the threshold). An improved clinical workflow based on evaluation of histologically stained tissue samples may be gained by using the approaches described herein to analyze how much pre-analytical factors affect the quality of the prepared stained tissue sample, for example, an image of the final stained tissue sample and/or the stain response in new tissue samples may be used to evaluate the stain quality. A human pathologist and/or an automated cancer (or other disease) diagnosis process (e.g., application running on a computer) may consider the predicted stain quality when making a diagnosis. For example, when the stain quality is poor no diagnosis may be made or an uncertain diagnosis may be made, while when the stain quality is high a diagnosis may be made with high certainty. A stain quality assessment tool may serve as a gold standard stain quality assessment for developing more robust staining protocols and/or assay products.

The effects of pre-analytic factors on stain quality are also antigen dependent, causing some IHC stains to be more sensitive to pre-analytic variation than others. HER2 is an example of a sensitive epitope that is routinely used in breast cancer diagnoses to decide the optimal treatment, for example as described with reference to Bauer and/or E. C. Colley & R. H. Stead, "*Fixation and Other Pre-Analytical Factors", in Immunohistochemical staining methods, IHC Guidebook, chapter* 2, 6th edition, Dako Denmark A/S, An Agilent Technologies Company (hereinafter "Colley"). However, insufficient staining can cause insufficient stain response in HER2 positive tissue structures and will therefore not be detected by a pathologist. The stain variation caused by the pre-analytical factors may then directly affect the diagnostic process and thereby the treatment and outcome for the patients, for example, as described with reference to Engel.

The technical challenge is that for the pathologist, the tissue changes stemming from poor preanalytical treatment are difficult to spot. While extensive tissue degradation due to warm ischemia, for instance, produces marked morphological changes, it requires expert knowledge from pathologists to be able to see the slight differences stemming from over- and underfixation. One parameter that pathologists can look at is the geometry of erythrocytes, but it's not common practice to evaluate this metric, and because the changes are minor, they are infrequently spotted. Another metric which can be evaluated is the sharpness of mitotic events, as it appears that overfixation slightly blurs the mitotic nuclear changes.

At least some implementations described herein improve over standard approaches for evaluating quality of samples of tissue. Previous approaches for quality control measures of tissue samples are manual based, relying on pathologists being trained enough to recognize problems with the pre-analytical parameters and make a decision on the tissue specimen based on this prior knowledge. Moreover, such manual approaches are subjective and not necessarily reproducible. In contrast, at least some implementations described herein use machine learning models to provide an automatic, objective, reproducible, and/or accurate analysis of tissue samples to determine preanalytical factors used in processing of the tissue. The preanalytical factors may indicate quality of the tissue sample, such as indication of whether fixation times are acceptable or not. The implementations based on machine learning model(s) described herein may significantly improve the workflow of the pathologist evaluating the tissue sample by making the analysis less subjective and improve decision making.

Of the many pre-analytical variables, tissue fixation time (i.e., a specific preanalytical factor) probably has the most significant effect on the quality of IHC and in situ hybridization (ISH) stains, as it affects many other variables such as antigen retrieval and epitope binding. At least some implementations described herein enable provide an automated, objective, reproducible, and/or accurate approach that predicts the fixation time in response to an image of a tissue sample, for example, in HER2 stained tissue samples. Stain quality may be determined according to the predicted fixation time. For example, good stain quality when the predicted fixation time falls within a correct range, and poor stain quality when the predicted fixation time is outside to the correct range indicating abnormal (e.g., incorrect) fixation times.

Considering the consequences of varying stain quality due to changing preanalytical conditions, the ability to help end users to interpret IHC stains better by informing them about potential biases in the staining would be useful to reduce risk for wrong patient treatments due to false positive/false negative interpretations of stains. In some cases, for instance with overfixation, it is known that increasing the pretreatment time can effectively overcome issues related to overfixation. In that case, without introducing further hardware other than brightfield slide scanners, it would be possible to inform a pathologist that a given specimen was under/overfixated using implementations described herein, and that a modified diagnostic staining protocol for that specimen might be required to give an accurate result. Such a tool may solve the technically challenging development of having limited knowledge of the fixation state of the incoming biological tissue used during development of new diagnostic assays. Even though official guidelines are commonly used by labs performing fixation, these have wide boundaries, and tissue density, size and geometry greatly impact the fixation degree of tissue specimens. With the possibility of measuring the relative fixation degree of tissues using implementations described herein, in the short term it would be possible to have an objective handle for selection of tissues for assay development, thus allowing for development of more robust staining protocols and diagnostic products.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
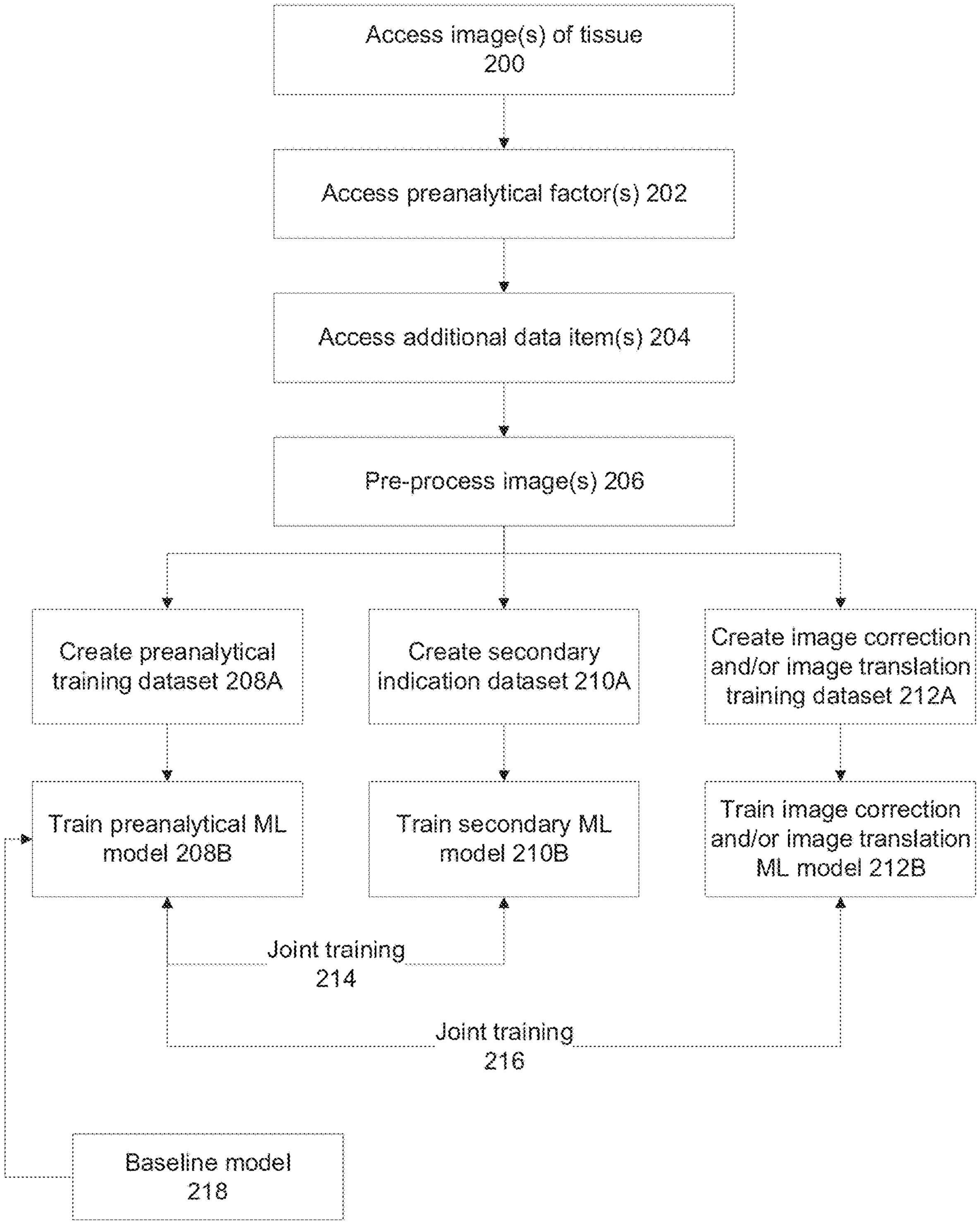
FIG. 2 is a flowchart of a process for training ML model(s) for generating an indication of preanalytical factor (s) used to process tissue depicted in a target image in response to the input of the target image, in accordance with some embodiments of the present invention.
Figure 3:
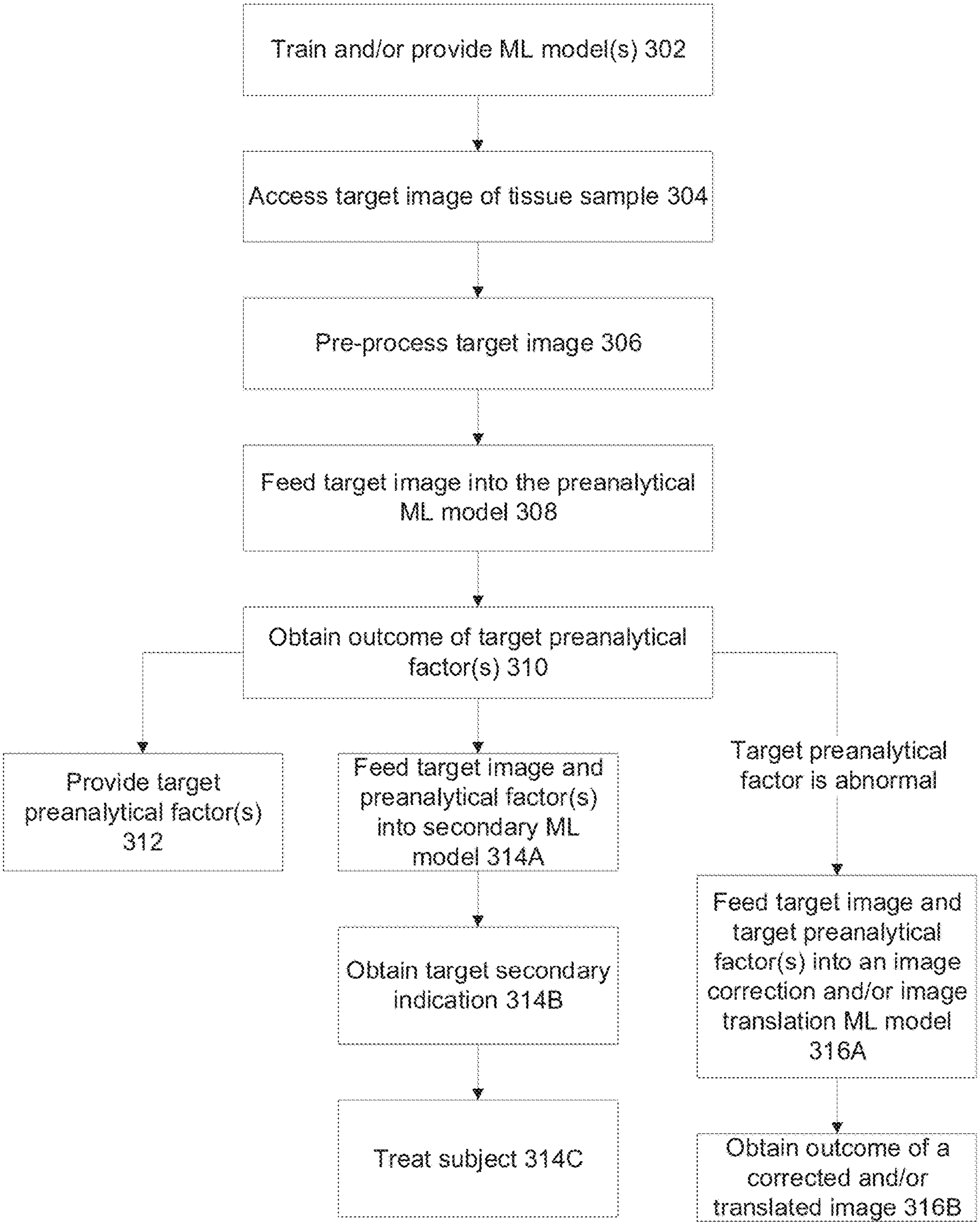
FIG. 3 is a flowchart of a process for using the ML model(s) to obtain the indication of preanalytical factor(s) in response to an input of target image(s) depicting tissue sample(s), in accordance with some embodiments of the present invention.
Figure 4:
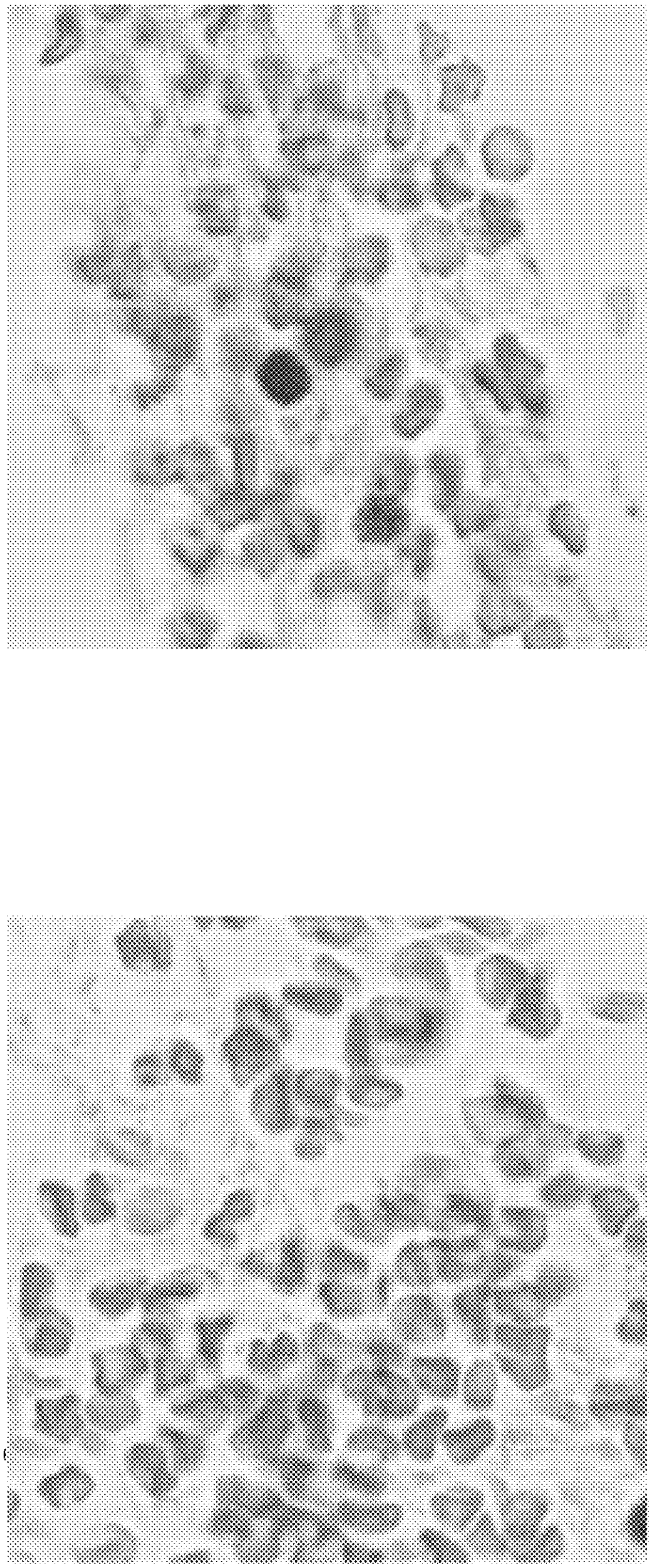
FIG. 4 is an example of images depicting slides of tissue samples with different fixation times, in accordance with some embodiments of the present invention.
Figure 5:
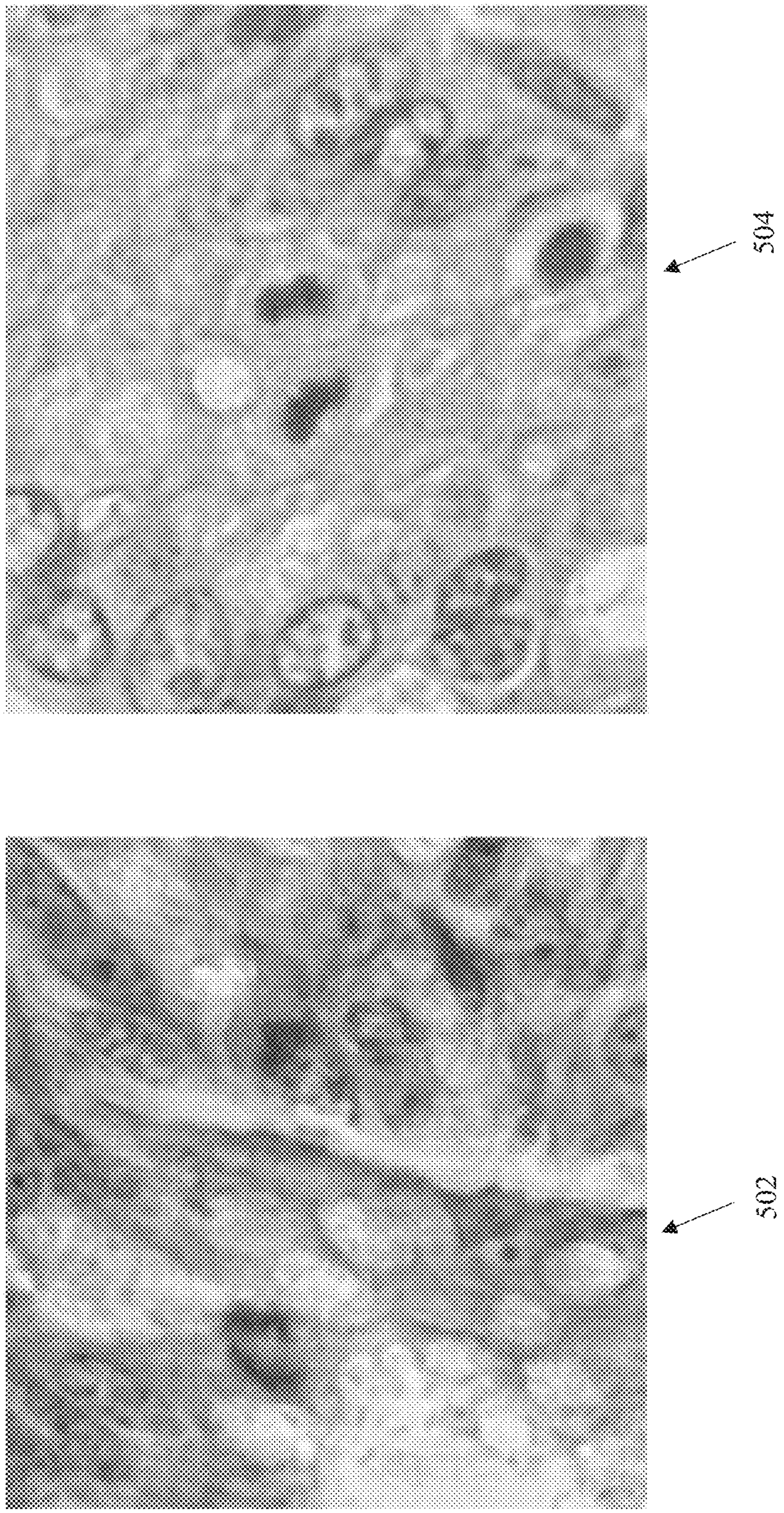
FIG. 5 is another example depicting slides of tissue samples with different fixation times, in accordance with some embodiments of the present invention.
Figure 6:
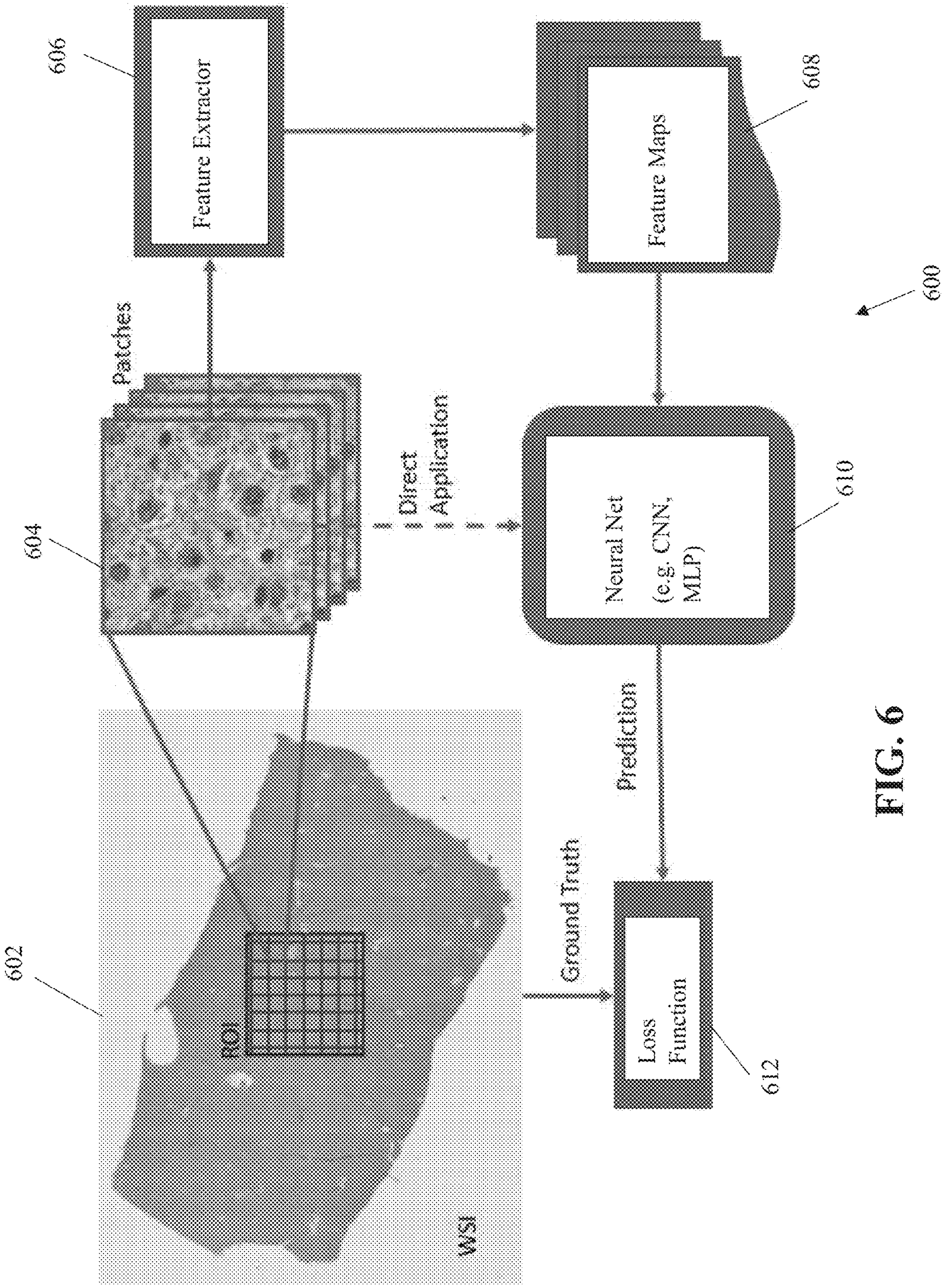
FIG. 6 is a schematic depicting a process of training a ML model using extracted features, in accordance with some embodiments of the present invention.
Figure 7:
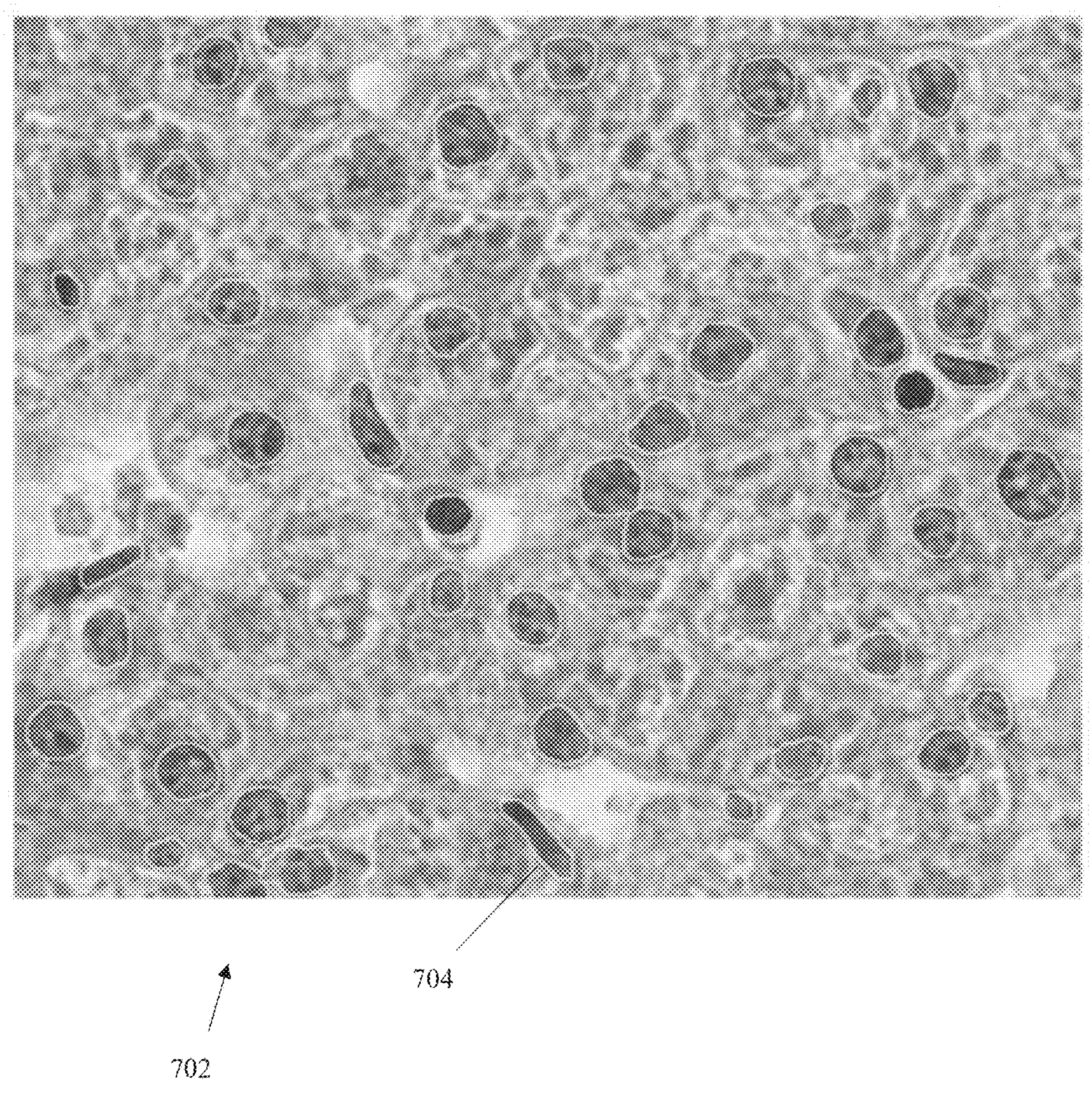
FIG. 7 depicts an image of tissue processed with one or more preanalytical factors, with segmented nuclei segmented by a nuclear segmentation ML model, in accordance with some embodiments of the present invention.

Reference is now made to FIG. 1, which is block diagram of components of a system 100 for training ML model(s) for generating an indication of preanalytical factor(s) used to process tissue depicted in a target image in response to the input of the target image and/or using the ML model(s) to obtain the indication of preanalytical factor(s) in response to an input of target image(s) depicting tissue sample(s), in accordance with some embodiments of the present invention. Reference is also made to FIG. 2, which is a flowchart of a process for training ML model(s) for generating an indication of preanalytical factor(s) used to process tissue depicted in a target image in response to the input of the target image, in accordance with some embodiments of the present invention. Reference is also made to FIG. 3, which is a flowchart of a process for using the ML model(s) to obtain the indication of preanalytical factor(s) in response to an input of target image(s) depicting tissue sample(s), in accordance with some embodiments of the present invention. Reference is also made to FIG. 4, which is an example of images depicting slides of tissue samples with different fixation times, in accordance with some embodiments of the present invention. Reference is also made to FIG. 5, which is another example depicting slides of tissue samples with different fixation times, in accordance with some embodiments of the present invention. Reference is also made to FIG. 6, which is a schematic depicting a process 600 of training a ML model using extracted features, in accordance with some embodiments of the present invention. Reference is now made to FIG. 7, which depicts an image 702 of tissue processed with one or more preanalytical factors, with segmented nuclei 704 (one nucleus shown for clarity) segmented by a nuclear segmentation ML model, in accordance with some embodiments of the present invention.

Referring now back to FIG. 4, image 402 depicts a sample of normally fixated red blood cells that underwent a normal fixation time of 26 hours. In contrast, image 404 depicts another sample of overfixated red blood cells that underwent an excess fixation time of 143 hours. It is difficult to visually distinguish between cells in image 404 and 402, especially since the images are of different cell samples, even for an expert pathologist. As such, it is difficult to determine that cells in image 404 are overfixated while cells in image 402 are normally fixated. As discussed herein, in some cases, the geometry of erythrocytes metric may be computed and used to try and determine fixation time, but it's not common practice to evaluate this metric, and because the changes are minor, they are infrequently spotted. In at least some implementations described herein, the trained ML model generates an outcome indicating the fixation time, and/or indicating whether fixation time is normal or abnormal, in response to an input of images 402 and/or 404.

Referring now back to FIG. 4, image 502 depicts a sample of normally fixated tissue that underwent a normal fixation time of 26 hours. In contrast, image 504 depicts another sample of overfixated tissue that underwent an excess fixation time of 143 hours. It is difficult to visually distinguish between cells in image 504 and 502, especially since the images are of different cell samples, even for an expert pathologist. As such, it is difficult to determine that cells in image 504 are overfixated while cells in image 502 are normally fixated. As discussed herein, in some cases, the sharpness of mitotic events metric may be computed and used to try to determine fixation time, but it's not common practice to evaluate this metric, and because the changes are minor, they are infrequently spotted. Overfixation as in 504 slightly blurs the mitotic nuclear changes in comparison to normal fixation in 502, but the changes are difficult to spot.

In at least some implementations described herein, the trained ML model generates an outcome indicating the fixation time, and/or indicates whether fixation time is normal or abnormal, in response to an input of images 502 and/or 504.

Referring now back to FIG. 1, system 100 may implement the acts of the method described with reference to FIGS. 2-7, optionally by a hardware processor(s) 102 of a computing device 104 executing code instructions 106A and/or 106B stored in a memory 106.

Computing device 104 may be implemented as, for example, a client terminal, a server, a virtual server, a laboratory workstation (e.g., pathology workstation), a procedure (e.g., operating) room computer and/or server, a virtual machine, a computing cloud, a mobile device, a desktop computer, a thin client, a Smartphone, a Tablet computer, a laptop computer, a wearable computer, glasses computer, and a watch computer. Computing 104 may include an advanced visualization workstation that sometimes is implemented as an add-on to a laboratory workstation and/or other devices for presenting images of samples of tissues to a user (e.g., pathologist).

Different architectures of system 100 based on computing device 104 may be implemented, for example, central server based implementations, and/or localized based implementation.

In an example of a central server based implementation, computing device 104 may include locally stored software that performs one or more of the acts described with reference to FIGS. 2-7, and/or may act as one or more servers (e.g., network server, web server, a computing cloud, virtual server) that provides services (e.g., one or more of the acts described with reference to FIGS. 2-7) to one or more client terminals 108 (e.g., remotely located laboratory workstations, remote picture archiving and communication system (PACS) server, remote electronic medical record (EMR) server, remote image storage server, remotely located pathology computing device, client terminal of a user such as a desktop computer) over a network 110, for example, providing software as a service (SaaS) to the client terminal(s) 108, providing an application for local download to the client terminal(s) 108, as an add-on to a web browser and/or a tissue sample imaging viewer application, and/or providing functions using a remote access session to the client terminals 108, such as through a web browser. In one implementation, multiple client terminals 108 each obtain images of the tissue samples from different imaging device(s) 112. Each of the multiple client terminals 108 provides the images to computing device 104. Computing device may feed the received image(s) into one or more machine learning model(s) 122A to obtain an outcome indicating preanalytical factors (e.g., estimated fixation time, and/or whether the fixation time was normal, or abnormal, such as too little (i.e., overfixation), or too much (i.e., overfixation), and others as described herein) and/or other outcomes of different ML models, such as secondary indication and/or corrected image, as described herein. The outcome obtained from computing device 104 may be provided to each respective client terminal 108, for example, for presentation on a display and/or storage in a local storage and/or feeding into another process such as a diagnosis application. Training of machine learning model(s) 122A may be centrally performed by computing device 104 based on images of tissue samples and/or annotation of data obtained from one or more client terminal(s) 108, optionally multiple different client terminals 108, and/or performed by another device (e.g., server(s) 118) and provided to computing device 104 for use.

In a local based implementation, each respective computing device 104 is used by a specific user, for example, a specific pathologist, and/or a group of users in a facility, such as a hospital and/or pathology lab. Computing device 104 receives sample images from imaging device 112, for example, directly, and/or via an image repository 114 (e.g., PACS server, cloud storage, hard disk). Annotations may be received from users (e.g., manually entered via an interface), and/or extracted from other sources, for example, from metadata outputted by tissue processing device(s) 150 indicating preanalytical factors used during processing of the tissues. Images may be locally fed into one or more machine learning model(s) 122A to obtain one or more outcome(s) described herein. The outcome(s) may be, for example, presented on display 126, locally stored in a data storage device 122 of computing device 104, and/or fed into another application which may be locally stored on data storage device 122. Training of machine learning model(s) 122A may be locally performed by each respective computing device 104 based on images of samples and/or annotation of data obtained from respective imaging devices 112, for example, different users may each train their own set of machine learning models 122A using the samples used by the user which were processed using a specific processing protocol and/or using a specific tissue processing device 150, and/or different pathological labs may each train their own set of machine learning models using their own images which were processed using their own specific tissue processing protocols and/or using their own specific tissue processing device 150. For example, a pathologist specializing in analyzing bone marrow biopsy trains ML models on images of bone marrow biopsy samples which were processed using preanalytical factors suitable for bone marrow. Another lab specializing in kidney biopsies trains ML models on images depicting kidney tissue obtained via a biopsy which were processed using preanalytical factors suitable for kidney tissue. In another example, trained machine learning model(s) 122A are obtained from another device, such as a central server.

Computing device 104 receives images of tissue samples, captured by one or more imaging device(s) 112. Exemplary imaging device(s) 112 include: a scanner scanning in standard color channels (e.g., red, green blue), a multispectral imager acquiring images in four or more channels, a confocal microscope, a black and white imaging device, and an imaging sensor.

Optionally, one or more tissue processing devices 150 process tissues using analytical factors(s), which may be known, and/or unknown, such as determined as described herein. For example, fix the tissues and/or apply stains to the tissue sample which is then imaged by imaging device 112.

Imaging device(s) 112 may create two dimensional (2D) images of the samples, optionally whole slide images.

Images captured by imaging machine 112 may be stored in an image repository 114, for example, a storage server (e.g., PACS, EHR server), a computing cloud, virtual memory, and a hard disk.

Training dataset(s) 122B may be created based on the captured images, as described herein.

Machine learning model(s) 122A may be trained on training dataset(s) 122B, as described herein.

Exemplary ML model(s) 122A include one or more of: preanalytical ML model, secondary ML model (e.g., clinical ML model), image correction ML model, and other ML models used in an optional pre-processing step, such as the nuclear segmentation ML model, RBC segmentation ML model, and/or interpretability ML model (e.g., as described with reference to 206 of FIG. 2).

Exemplary architectures of the machine learning models described herein include, for example, statistical classifiers and/or other statistical models, neural networks of various architectures (e.g., convolutional, fully connected, one or more convolutional layers with one or more subsequent connected layers, deep, encoder-decoder, recurrent, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised or reinforcement learning. Machine learning models may be trained using supervised approaches and/or unsupervised approaches.

Machine learning models described herein may be fine turned and/or updated. Existing trained ML models trained for certain types of tissue, such as bone marrow biopsy, may be used as a basis for training other ML models using transfer learning approaches for other types of tissue, such as blood smear. The transfer learning approach of using an existing ML model may increase the accuracy of the newly trained ML model and/or reduce the size of the training dataset for training the new ML model, and/or reduce the time and/or reduce the computational resources for training the new ML model, over standard approaches of training the new ML model 'from scratch'.

Computing device 104 may receive the images for analysis from imaging device 112 and/or image repository 114 using one or more imaging interfaces 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), or software development kit (SDK)). Alternatively or additionally, computing device 104 may receive the images from client terminal(s) 108 and/or server(s) 118.

Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as a program store, and/or data storage device) stores code instructions for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A and/or training code 106B that implements one or more acts and/or features of the method described with reference to FIGS. 3-7.

Computing device 104 may include a data storage device 122 for storing data, for example, machine learning model(s) 122A as described herein and/or training dataset 122B for training machine learning model(s) 122A as described herein. Data storage device 122 may be implemented as, for example, a memory, a local hard-drive, a removable storage device, an optical disk, a storage device, and/or as a remote server and/or computing cloud (e.g., accessed over network 110). It is noted that execution code portions of the data stored in data storage device 122 may be loaded into memory 106 for execution by processor(s) 102.

Computing device 104 may include data interface 124, optionally a network interface, for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may access one or more remote servers 118 using network 110, for example, to download updated versions of machine learning model(s) 122A, code 106A, training code 106B, and/or the training dataset(s) 122B.

Computing device 104 may communicate using network 110 (or another communication channel, such as through a direct link (e.g., cable, wireless) and/or indirect link (e.g., via an intermediary computing device such as a server, and/or via a storage device) with one or more of:

Client terminal(s) 108, for example, when computing device 104 acts as a server providing image analysis services (e.g., SaaS) to remote laboratory terminals, as described herein.

Server 118, for example, implemented in association with a PACS and/or electronic medical record, which may store images of samples from different individuals (e.g., patients) for processing, as described herein.

Image repository 114 that stores images of samples captured by imaging device 112.

It is noted that imaging interface 120 and data interface 124 may exist as two independent interfaces (e.g., two network ports), as two virtual interfaces on a common physical interface (e.g., virtual networks on a common network port), and/or integrated into a single interface (e.g., network interface).

Computing device 104 includes or is in communication with a user interface 126 that includes a mechanism designed for a user to enter data (e.g., manual entry of preanalytical factors for annotation of images) and/or view data (e.g., the preanalytical factors predicted by the ML model(s)). Exemplary user interfaces 126 include, for example, one or more of, a touchscreen, a display, a keyboard, a mouse, and voice activated software using speakers and microphone.

Referring now back to FIG. 2, at 200, one or more images of tissue (e.g., of slides), optionally pathological tissue, of one or more subjects, processed with at least one preanalytical factor, is obtained and/or accessed.

Multiple images of multiple slides, each depicting a tissue sample obtained from a different subject may be obtained. The multiple images may be from different slides of the same tissue. Alternatively or additionally, multiple images from different slides of different tissues of the same subject are obtained. Images may be of a same type of tissue sample obtained from the different subjects, for example, blood smear, bone marrow biopsy, surgically removed tumor, and polyp extracted from a biopsy. ML model(s) that are provided and/or trained may correspond to one or each tissue type; or alternatively, images depicting different types of tissues from different patients.

The tissue on the slide may include Formalin-fixed paraffin-embedded (FFPE) tissue.

The images may be obtained, for example, from an image sensor that captures the images, from a scanner that captures images, or from a server that stores the images (e.g., PACS server, EMR server, pathology server). For example, tissue images are automatically sent to analysis after capture by the imager and/or once the images are stored after being scanned by the imager.

As used herein, the term "image" may refer to whole slide images (WSI), and/or patches extracted from the WSI, and/or portions of the sample. For example, a phrase indicating that the image is fed into a ML model may refer to patches extracted from the WSI that are fed into the ML model.

The images may be of the sample obtained at high magnification, for example, for an objective lens—between about 20×-40×, or other values. Such high magnification imaging may create very large images, for example, on the order of giga pixel sizes. Each large image may be divided into smaller sized patches, which are then analyzed. Alternatively, the large image is analyzed as a whole. Images may be scanned along different x-y planes at different axial (i.e., z axis) depth.

The tissue may be obtained intra-operatively, during for example, a biopsy procedure, a fine needle aspiration (FNA) procedure, a core biopsy procedure, a liquid biopsy procedure, colonoscopy for removal of colon polyps, surgery for removal of an unknown mass, surgery for removal of a benign cancer, surgery for removal of a malignant cancer, and/or surgery for treatment of a medical condition. Tissue may be obtained from fluid, for example, urine, synovial fluid, blood, and cerebral spinal fluid. Tissue may be in the form of a connected group of cells, for example, a histological slide. Tissue may be in the form of individual cells or clumps of cells suspended within a fluid, for example, a cytological sample.

At 202, an indication of the preanalytical factor(s) used during processing of the tissue depicted in reach respective image is obtained and/or accessed, for example, automatically extracted (e.g., from a record associated with the slide, such as outputted by a side preparation device) and/or manually inputted by a user. The indication may be stored, for example, as metadata, a tag, and/or a value of a field.

Exemplary preanalytical factors include: fixation time, tissue thickness obtained by sectioning of the FFPE block. fixative type, warm ischemic time, cold ischemic time, duration and delay of temperature during prefixation, fixative formula, fixative concentration, fixative pH, fixative age of reagent, fixative preparation source, tissue to fixative volume ratio, method of fixation, conditions of primary and secondary fixation, postfixation washing conditions and duration, postfixation storage reagent and duration, type of processor, frequency of servicing and reagent replacement, tissue to reagent volume ratio, number of position of co-processed specimens, dehydration and clearing reagent, dehydration and clearing temperature, dehydration and clearing number of changes, dehydration clearing duration, baking time, and temperature.

The preanalytical factor(s) may include an indication of staining quality of the slide. Exemplary stains include IHC stains, in situ hybridization (ISH) stains, other approaches for ISH such as fluorescence ISH (FISH), chromogenic ISH (CISH), silver ISH (SISH) and the like, Hematoxylin and Eosin (H&E), Hematoxylin, Acridine orange, Bismarck brown, Carmine, Coomassie blue, Cresyl violet, Crystal violet, 4',6-diamidino-2-phenylindole ("DAPI"), Eosin, Ethidium bromide intercalates, Acid fuchsine, Hoechst stain, Iodine, Malachite green, Methyl green, Methylene blue, Neutral red, Nile blue, Nile red, Osmium tetroxide, Propidium Iodide, Rhodamine, Safranine, antibody-based stain, or label-free imaging marker (which may result from the use of imaging techniques including, but not limited to, Raman spectroscopy, near infrared ("NIR") spectroscopy, autofluorescence imaging, or phase imaging, and/or the like, and/or which may be used to highlight features of interest without an external dye or the like), and/or the like. In some cases, the contrast when using label-free imaging techniques may be generated without additional markers such as fluorescent dyes or chromogen dyes, or the like.

At 204, one or more additional data items may be obtained and/or accessed, such as per respective subject, for example, automatically (e.g., extracted from a record, such as an electronic health record of the respective subject) and/or manually provided by a user. The additional data items may be stored, for example, as metadata, a tag, and/or a value of a field.

The additional data items may serve as ground truth in record(s) of training dataset(s) for training one or more ML models, and/or may be used as input into the ML models, as described herein.

Optionally, the additional data items may include a secondary indication for a respective subject. Examples of secondary indications include: a tag, metadata, an image, and a segmentation outcome of a segmentation model fed the image. The secondary indication may be a clinical indication (e.g., for clinical indication records of clinical indication training datasets for training a clinical indication ML model), for example, a clinical score (e.g., ratio of specific immune cells to total immune cells, rating of invasiveness of cancer into tissue), a clinical diagnosis of a medical condition (e.g., malignant, benign, adenoma, lung cancer), and a pathological report.

Alternatively or additionally, the additional data item may be an indication of whether the respective preanalytical factor(s) is classified as normal (e.g., correctly applied), or classified as abnormal (e.g., erroneously applied, incorrect operating value, anomalous application). The quality of the slide is determined according to whether the preanalytical factor(s) is normal or abnormal. For example, whether the preanalytical factor(s) is within a range defined as a correct operating range suitable for obtaining quality slides, or whether the preanalytical factor(s) is outside the correct operating range (i.e., erroneous) and therefore the quality of the slide is degraded. The indication whether the preanalytical factor(s) is normal or abnormal may be used to select images depicting normal preanalytical factors to serve as ground truth and other images depicting abnormal preanalytical factors, for inclusion in the image correction training dataset, as described herein.

Alternatively or additionally, the additional data item may be metadata indicating unknown preanalytical factor(s). For each image of each slide, some preanalytical factor(s) may be known, and some preanalytical factor(s) may be unknown.

At 206, one or more (e.g., each respective) images may be preprocessed, for example, extracting patches, extracting features, segmenting nuclei, color conversion, RBC segmentation, and computing an interpretability map.

Optionally, features are extracted from the respective image. Features may be extracted using a pretrained feature extractor. The extracted features may serve as ground truth in record(s) of training dataset(s) for training one or more ML models, and/or may be used as input into the ML models, as described herein.

The pretrained feature extractor may be implemented as a neural network (e.g., deep neural network) and/or other ML model architecture and/or other feature extraction architecture which may be non-ML based (e.g., scale-invariant feature transform (SIFT) and/or speeded up robust features (SURF)). The extracted features are obtained from at least one feature map before a classification layer of the neural network when the neural network is fed the target image. For example, from a layer just before the classification layer, and/or from one or more deeper layer(s), for example, using a projection head on top of the learned representation. The neural network may be, for example, an image classifier trained on an image training dataset of non-tissue images labelled with ground truth classification categories. Alternatively or additionally, the neural network is a nuclear segmentation network trained on a segmentation training dataset of images of slides of pathological tissues labelled with ground truth segmentations of nuclei and/or nucleoli. Bottleneck layers may be extracted from the nuclear segmentation network. In such implementation, the extracted features are the segmentations of the nuclei and/or masks of the nuclei segmentations, outputted by the neural network. Alternatively or additionally, other features may be extracted, for example, hand crafted features, and/or features automatically identified by a feature searching process (e.g., SIFT, SURF).

Alternatively or additionally, patches are extracted from the image. Patches may be used, rather than the whole slide, to increase computational efficiency of the computing device during training and/or inference, i.e., a patch is smaller than the whole slide image and therefore fewer computational resources are required to process the patch over the whole slide image. In some cases, the same preanalytical factor(s) may apply to the entire tissue sample depicted in the image (e.g., on the slide). In such cases, determining the preanalytical factor(s) for a patch infers the preanalytical factor(s) for the entire image. In other cases, the preanalytical factor may vary locally for different regions of the image (e.g., on the slide), for example, thickness of the tissue may vary which may impact the local preanalytical factor, fixation time may locally vary, and autolysis may locally vary. In such cases, different patches of the same image may have varying values for the preanalytical factors.

Features may be extracted from the patches, for example, using approaches described herein for extracted features from the image. Patches may be obtained from a region of interest (ROI), which may be a rectangle having a preset size (e.g., number of pixels of a length and/or width) optionally at a preset magnification. The ROI may be a region of the WSI. Patches may be extracted in a grid covering the ROI. Patches may be overlapping (e.g., at a preset overlapping amount) and/or non-overlapping. Features extracted from patches may be stitched together to create an enhanced feature map, and/or used as individual features.

For each image and/or each patch, the features extracted from the respective patch and/or image may be reduced to a feature vector. The reduction may be done, for example, using a global max pooling layer and/or a global average pooling layer. The preanalytical record (used for training the preanalytical ML model) may include the feature vector. Optionally, during training of a neural network implementation, the preanalytical ML model (e.g., a convolutional neural network (CNN), fully-connected network, and attention-based (transformer) network), the convolutional layer(s) may operate directly on the inputted features patch. Optionally, non-neural network implementations of the ML model (e.g., tree-based approaches such as gradient boosting trees (GBT) and random forest, and others) may operate on features extracted by other approaches (e.g., SIFT, SURF). The preanalytical machine learning generates the outcome of the target preanalytical factor in response to the input of feature vectors computed for features extracted from patches of the target image and/or extracted from the target image.

Referring now back to FIG. 6, features described with reference to FIG. 5 may be implemented as, combined with, and/or replaced with features described with reference to FIG. 6. At 602, an image of a tissue sample processed with one or more preanalytical factors, optionally a whole slide image is obtained, for example, as described with reference to 200 of FIG. 2. A ground truth indicating the preanalytical factor(s) used to process the tissue depicted in the image is obtained, for example, as described with reference to 202 of FIG. 2. At 604, patches are extracted from the image of the tissue, optionally from the ROI. At 606, a feature extracted is applied to the patches for extracting features, for example, as described with reference to 206 of FIG. 2. At 608, feature maps may be extracted, for example, as described with reference to 206 of FIG. 2. At 610, a training dataset that includes records of feature maps and/or extracted features labelled with ground truth, for example, as described with reference to 208A of FIG. 2. At 612, the ML model is trained using a loss function, for example, as described with reference to 208B of FIG. 2. Alternatively, features 606 and/or 608 are omitted, in which case the patches of 604 are included in the records of the training dataset of 610, labelled with respective ground truth indications of preanalytical factor(s).

Referring now back to 206 of FIG. 2, alternatively or additionally, the image is fed into a nuclear segmentation machine learning model to obtain an outcome of a segmentation of nuclei in the image. A mask that masks out pixels external to the segmentation of the nuclei may be created based on the outcome of the segmentation. The mask is applied to the image to create a masked image. The masked image may be used in records (e.g., preanalytical record) instead of and/or in addition to the image itself for training ML model(s) (e.g., preanalytical machine learning model). During inference, a target masked image created from the target image is fed into the trained (e.g., preanalytical) machine learning model, for example, to obtain the target preanalytical factor(s).

Alternatively or additionally, when the image is fed into a nuclear segmentation machine learning model to obtain an outcome of a segmentation of nuclei in the image, a boundary (e.g., minimally bounding rectangles, or other context to enable inferring from the surrounding of the nuclei) may be made around each segmentation to create single-nuclei patches. The single-nuclei patches may be used in records (e.g., preanalytical record) instead of and/or in addition to the image itself for training ML model(s) (e.g., preanalytical machine learning model). During inference, a target segmentation of nuclei created from the target image is fed into the trained (e.g., preanalytical) machine learning model, for example, to obtain the target preanalytical factor(s).

Referring now back to FIG. 7, image 702 of tissue processed with one or more preanalytical factors is depicted, which includes segmented nuclei 704 (one nucleus shown for clarity) segmented by a nuclear segmentation ML model. The nuclear segmentation ML model may be trained, for example, on a training dataset of images of cells labelled with ground truth segmentations of nuclei. The nuclear segmentation ML model may compute the segmentations using other approaches, for example, analyzing color distribution of the cells to identify the segmented nuclei.

Referring now back to 206 of FIG. 2, alternatively or additionally, a color version of the image is converted to a gray-scale version of the image. The gray-scale image may be used in records (e.g., preanalytical record) instead of and/or in addition to the color image for training ML model(s) (e.g., preanalytical machine learning model). During inference, a target gray-scale version of the target images is fed into the trained (e.g., preanalytical) machine learning model, for example, to obtain the target preanalytical factor(s). The use of gray-scale images instead of and/or in addition to color images may discourage the ML model from learning irrelevant color variations, for example, arising from different stains, different imaging sensors, and the like.

Alternatively or additionally, the image is fed into a red blood cell (RBC) segmentation machine learning model to obtain an outcome of a segmentation of RBCs in the image and/or patches that depict RBCs. The segmentations of RBC and/or patches that depict RBCs may be used in records (e.g., preanalytical record) instead of and/or in addition to the image itself for training ML model(s) (e.g., preanalytical machine learning model). During inference, a target segmentation of RBC and/or patches that depict RBC from the target image is fed into the trained (e.g., preanalytical) machine learning model, for example, to obtain the target preanalytical factor(s). RBCs are more sensitive to the fixation process, and may be a good indication for whether the preanalytical factor is correct or abnormal, for example, indicating over fixation and/or under fixation.

Alternatively or additionally, an interpretability machine learning model is trained to generate an interpretability map indicating relative significance of pixels of the target image to obtaining the target preanalytical factor. The interpretability map may be implemented, for example, as an attention map, a probability map, and/or class activation map. The target image which is used to obtain the interpretability map may be at low resolution. High resolution patches of the target image may then be sampled according to the interpretability map computed from the low resolution target image. The high resolution patches may be selected, for example, as a K number of sampled patches, where K denotes a hyperparameter of the ML model), based on relevance of the patches and/or other considerations such as selecting the K most relevant, and/or attempting to select the most relevant without selecting all the patches from the sample region of the sample. In another example, the high resolution patches may be selected as having relative significance above a threshold. The high resolution patches may be used in records (e.g., preanalytical record) instead of and/or in addition to the image itself for training ML model(s) (e.g., preanalytical machine learning model). During inference, high resolution patches extracted from the target image are fed into the trained (e.g., preanalytical) machine learning mode to obtain the target preanalytical factor(s).

Referring now back to FIG. 2, features described with reference to 208A-B, 210A-B, and 212A-B represent different ML models that may be trained using the data obtained in features 200-206. Training may be performed using a loss function, for example, a standard cross entropy loss function.

At 208A, a preanalytical training dataset of multiple records is created. A preanalytical record includes the image of the slide of (e.g., pathological) tissue of a respective subject processed with the preanalytical factor(s), a ground truth label indicating the preanalytical factor, and optionally other data described with reference to 204 and/or 206. The other data may be in addition to the image, and/or may be an implementation of the image, such as a patch extracted from the image. The other data may include one or more of: patches extracted from the image, features extracted from the image, segmented nuclei, a color converted image (e.g., black and white image), RBC segmentation, and interpretability map(s).

The preanalytical record may further include metadata indicating two types of preanalytical factors, (i) known preanalytical factor(s) and (ii) preanalytical factor(s) which are predicted to be unknown during inference (but known during training). The known preanalytical factors may be correlated with preanalytical factors(s) that are unknown at inference time. During inference, the value of the known preanalytical factors is fed into the ML model and used to help determine the value of the unknown preanalytical factor(s). For example, the preanalytical factor FISH is very sensitive to overfixation. During inference, the known preanalytical factor FISH is fed into the ML model and may be used to help the ML model infer information about the degree of fixation and/or degree of autolysis of tissue, in tissue blocks where such preanalytical factor(s) are unknown. In order to train such a model, the ground truth label of is of the preanalytical factor(s) which are predicted to be unknown during inference (but known during training).

At 208B, the preanalytical machine learning model is trained on the preanalytical training dataset for generating an outcome of preanalytical factor(s) used to process tissue depicted in a target image, in response to an input of the target image.

Optionally, the ground truth label indicating the preanalytical factor includes a ground truth label indicating whether the applied preanalytical factors were correctly applied, or whether application of the preanalytical factors is anomalous. In such a case, an implementation of the machine learning model may be trained for learning a distribution of inlier images labelled as correctly applied preanalytical factors for detecting an image as an outlier, indicating incorrectly applied preanalytical factors. The implementation of the ML model may be, for example, an autoencoder, a variational autoencoder (VAE), and a generative adversarial network (GAN), and the like.

Optionally, the preanalytical machine learning model is pre-trained on another image training dataset that includes images, each labeled with a respective ground truth indication of a certain classification category. The pre-trained preanalytical training dataset is further trained on the preanalytical training dataset.

At 210A, a secondary indication training dataset of records is created. A secondary indication record includes the respective image of the slide of pathological tissue of the respective subject processed with the preanalytical factor(s), the indication of the preanalytical factor(s), and a ground truth label indicating the secondary indication, and optionally other data described with reference to 204 and/or 206 (e.g., examples provided with reference to 208A).

Optionally, the preanalytical factor(s) of the secondary indication record include at least one feature map extracted from a hidden layer(s) of the preanalytical machine learning model fed the image of the slide of pathological tissue of the subject processed with the preanalytical factor(s). The hidden layer(s) may include one or more layers, which may be the last layer or other layers before the classification layer. During inference, the secondary machine learning model generates the outcome of the target secondary indication in response to an input of the target image and a target feature map extracted from a hidden layer of the preanalytical machine learning model fed the target image.

At 210B, a secondary machine learning model is trained on the secondary indication training dataset for generating an outcome of a target secondary indication in response to an input of a target image and target preanalytical factor(s) used to process tissue depicted in the target image. The target preanalytical factor(s) may be obtained as an outcome of the preanalytical machine learning model fed the target image.

At 212A, an image correction training dataset of multiple records is created. An image correction record includes the image of the slide of pathological tissue of the subject processed with the preanalytical factor(s). The record includes an image of the slide depicting abnormally processed pathological tissue. The record also includes the indication that the preanalytical factor(s) is classified as abnormal. Images for which the preanalytical factor(s) is classified as normal are excluded. The record further includes an indication of the preanalytical factor(s). The record further includes a ground truth label of a normal image of a slide (e.g., the same tissue as the abnormal slide, or another image which may be of tissue similar to the slide labeled as abnormal), optionally pathological tissue, processed with preanalytical factor(s) classified as normal.

Alternatively or additionally, an image translation training dataset of two or more sets of image translation records is created, where each set includes a source set of source image translation records and a destination set of destination image translation records. The sets may be split by classification of preanalytical factors. A source image translation record of the source set of image translation records may include a source image of the slide of pathological tissue of the subject processed with the preanalytical factor, and a ground truth indicating a source label. The source label may indicate pathological tissue abnormally processed with the preanalytical factor. A destination image translation record of the destination set of image translation records may include a destination image of the slide of pathological tissue of the subject processed with the preanalytical factor, and a ground truth indicating a destination label. The destination label may indicate pathological tissue normally processed with the preanalytical factor.

At 212B, an image correction machine learning model is trained on the image correction training dataset for generating an outcome of a synthesized corrected image of a slide of pathological tissue that simulates what a target image of the slide would look like when processed with the preanalytical factor(s) classified as normal, in response to an input of the target image of the slide processed with target preanalytical factor classified as abnormal.

Alternatively or additionally, an image translation machine learning model is trained on the image translation training dataset. The image translation ML model is for converting a target source image of a slide of pathological tissue of the source set of image translation records to an outcome destination of a slide of pathological tissue of the destination set of image translation records.

Exemplary architectures for implementing the image correction ML model and/or the image translation ML model include: un-supervised image translation, self-supervised image translation, CycleGAN, StarGAN, unsupervised image-to-image translation (UNIT), and multimodal unsupervised image-to-image translation (MUNIT).

At 214, the preanalytical machine learning model and the secondary machine learning model may be jointly trained (e.g., end-to-end) using at least common images and common labels of preanalytical factors. For example, some of the images and/or labels are common, and some of the images and/or labels are unique to one or both of the preanalytical and secondary ML models. The common images and/or labels may be used for the joint (e.g., end-to-end) training, with the unique images and/or labels used, for example, where there is no secondary outcome but preanalytical factor(s) are present to enable joint training.

At 216, the image correction machine learning model and the preanalytical machine learning model may be jointly trained using common images and common ground truth labels of preanalytical factors.

At 218, a baseline model may be trained using a self-supervised and/or unsupervised approach on an unlabeled training dataset of unlabeled images of tissues, or optionally pathological tissues, of subject(s) processed with preanalytical factors(s). The unlabeled images may be of similar tissues, and/or of different tissues, than those used in the records described herein. The unlabeled images may be of similar preanalytical factor(s) and/or of different preanalytical factors than those used in records described herein. The baseline model is then trained on the preanalytical training dataset for creating the preanalytical machine learning model. It is noted that the baseline model may be trained on the secondary indication training dataset for creating the secondary ML model and/or trained on the image correction training dataset for creating the image correction ML model.

The baseline model may be used as an alternative to using the feature extractor, and/or may be used in addition to using the feature extractor. Feature extraction may be used for rapid training under a cross-validation scheme. Using a fine-tuning procedure, where the baseline model (e.g., a pretrained network) is used as the initial state and parts or all of the network layers are trained using the training dataset may allow the network to learn more relevant features on a lower level.

Referring now back to FIG. 3, at 302, ML model(s) are trained and/or provided, for example, as described with reference to FIG. 2. ML model(s) include one or more of: preanalytical ML model, secondary ML model, image correction ML model, and other ML models used in an optional pre-processing step, such as the nuclear segmentation ML model, RBC segmentation ML model, and/or interpretability ML model (e.g., as described with reference to 206 of FIG. 2).

At 304, a target image of a sample of tissue, optionally pathological tissue, of a subject is obtained and/or accessed, for example, as described with reference to 200 of FIG. 2.

At 306, the target image may be pre-processed, for example by one or more of: extracting patches, extracting features, segmenting nuclei, color conversion, RBC segmentation, and computing an interpretability map, for example, as described with reference to 206 of FIG. 2. The pre-processing corresponds to the pre-processing done in 206 of FIG. 2 to obtain data for respective training datasets used to train respective ML models, as described with reference to FIG. 2.

At 308, the target image (optionally pre-processed) is fed into the preanalytical machine learning model. Alternatively or additionally, one or more of the following obtained as described with reference to 306 are fed into the preanalytical ML model: extracted features, patches, segmented nuclei, converted color image, RBC segmentation, interpretability map, and/or other data obtained from the target image.

At 310, an outcome of target preanalytical factor(s) used to process the target image is obtained from the preanalytical machine learning model.

At 312, the target preanalytical factor(s) is provided, for example, presented on a display, stored on a data storage device (e.g., as a tag of the image), and/or forwarded to another process for input and/or further processing.

Alternatively or additionally, at 314A, the target image, the preanalytical factor(s), and optionally one or more additional data obtained as described with reference to 306, are fed into the secondary machine learning model.

The input of the preanalytical factor(s) fed into the secondary machine learning model may be obtained as the outcome of the preanalytical machine learning model fed at least the target image, as described with reference to 310.

At 314B, an outcome of a target secondary indication is obtained from the secondary machine learning model.

At 314C, the subject may be treated with a treatment effective for the medical condition, according to the target secondary indication. For example, when the secondary score is above a threshold, the subject may be treated with chemotherapy.

At 316A, in response to the target preanalytical factor being classified as abnormal, the target image and the target preanalytical factor(s) are fed into the image correction machine learning model and/or into the image translation ML model.

It is noted that the preanalytical factor classification is not necessarily binary, for example, normal abnormal. In some cases, the binary classification is not necessarily possible, for example when the preanalytical factors are applied to the whole tissue, block, are not reversible or incremental, and/or when there is no particular "right" or "wrong" but rather different possibilities. There may be multiple categories, for example, three or more classifications, which may depend on the particular preanalytical factor. For example, when the preanalytical factor is time, there may be 5 categories, for example, 0-9 hours, 9-20 hours, 20-60 hours, 60-120 hours, and greater than 120 hours.

For the image translation ML model, the target source image may include the input image and additional metadata indicating a source preanalytical factor indicating the state of the input image. The source preanalytical factor may be the obtained indication such as normal, abnormal, or other classification outcome obtained as in 310. For example, the source preanalytical factor may indicate abnormal processing. Other optional metadata indicates a destination preanalytical factor for the desired outcome image that is generated, for example, to generate an image that is normally processed, to generate an image where processing is done for a selected classification category such as 20-60 hours. For example, the target source image has a preanalytical factor of 9-20 hours, and an image depicting 20-60 hours is desired. The metadata may be explicit, for example, automatically generated and/or selected by a user. The metadata may be implicit as a default, for example, the desired preanalytical factor for the outcome image is what is normal or the preanalytical factor that is most optimal or otherwise "best". Alternatively or additionally, in the case where no explicit metadata is provided, the target source image may include the input image without the explicit metadata. Optionally, a reference image from the destination set is used to infer the destination of the input image.

There may be multiple image translation ML models and/or different image correction ML models trained on different source sets and/or different training sets, for example, different training sets depicting different preanalytical factors. The image translation ML model and/or the image correction ML model may be selected, and/or the source set may be selected, for example, according to an input of the preanalytical factor obtained as the outcome of the preanalytical machine learning model fed the target image.

The target preanalytical factor may be classified as normal or abnormal, for example, by applying a set of rules to the target preanalytical factor obtained as an outcome of the preanalytical ML model. In another example, applying a range and/or threshold defines correct values for the target preanalytical factor. When the target preanalytical factor is within the range or below (or above) the threshold, the target preanalytical factor is classified as normal, and when the target preanalytical factor is outside the range or above (or below) the threshold, the target preanalytical factor is classified as abnormal. In another example, the outcome of the preanalytical ML model may include a classification label indicating whether the target preanalytical factor is classified as normal or abnormal. To obtain such an outcome, records of the preanalytical training dataset may include a ground truth indication of normal or abnormal for the respective preanalytical factor of the respective record.

The input of the preanalytical factor(s) fed into the image correction machine learning model and/or the image translation ML model may be obtained as the outcome of the preanalytical machine learning model fed the target image, as described with reference to 310.

At 316B, an outcome of a corrected image that simulates what the target image of the slide would look like when processed with the preanalytical factor(s) classified as normal, is obtained as an outcome of the image correction machine learning model.

Alternatively or additionally, an outcome destination image of a slide of pathological tissue of the destination set of image translation records that is a conversion of the abnormally processed target image into a normally processed image is obtained from the image translation ML model.

Various embodiments, implementations, and aspects of the present invention as delineated hereinabove and as claimed in the claims section below find experimental and/or calculated support in the following examples.

Examples

Reference is now made to the following examples, which together with the above descriptions illustrate some embodiments and/or implementations of the invention in a non limiting fashion.

Inventors performed experiments to investigate at least some implementations of machine learning models trained to generate outcomes indicating fixation time in response to images and/or features extracted from images, of fixed samples of tissue, as described herein

Materials

Access to tissue from a freshly prepared porcine tissue was obtained by the University of Copenhagen. As described herein, Inventors considered that the fixation time is a major effector on stain quality outcome. As such a training dataset where Inventors had complete control over the ischemic time and the only variable was the fixation time in neutral buffered formalin, was prepared. In total, 144 blocks were created, representing 6 different fixation times across 8 different organ systems done in triplicates. For feasibility, sections were cut from blocks from the liver tissue organ system and were stained with eosin and hematoxylin (H&E) using standardized protocols in a Dako Coverstainer instrument. Samples were scanned on a Phillips UltraFast slide scanner to create a training dataset of whole slide images, which Inventors tested using the different machine learning computational approaches described herein below. Inventors successfully trained several networks that were able to differentiate between fixation times.

Methods

Inventors evaluated a first feature extraction approach in which features were extracted from patches taken out of the whole slide images (WSI) prepared as in the materials section. Features were extracted using a pretrained Feature Extractor, for example, a deep Neural Net, or some other feature extraction mechanism, as described herein. These features were then used to train a preanalytical machine learning model, such as a classification and/or a regression model, for inferring the fixation time, as described herein. Inventors evaluated two pretrained networks for feature extraction, a ResNet18 and a UNet.

The ResNet18 is a publicly available image classifier, trained on ImageNet dataset, from which Inventors extracted the last features map before the classification layer. The patches extracted with ResNet18 were of size 224×224×3. The extracted features from the ResNet18 have a vector dimension of 512.

The UNet is a customized trained nuclear segmentation network, from which Inventors extracted the bottleneck layers. The patches extracted using the customized UNet network were of size 256×256×3. The extracted features from the UNet have a vector dimension of 2048.

From each whole slide image, a region of interest (ROI) rectangle of 10,000-20,000 pixels to a side (×40 magnification) was selected for extraction. Patches were extracted in a grid covering the ROI. Inventors tried extraction of both partially overlapping patches and non-overlapping patches. The extracted features of each patch were either stitched together to create an extracted feature map or saved as individual features.

The extracted features or feature maps were split into Train/Validation datasets, in a 5-fold cross validation (CV) scheme. For each CV fold, all the features extracted from the same WSI were selected together, either all for Train or all for Validation. If feature maps were extracted, rather than individual features, they were split during training to a grid of non-overlapping or partially overlapping feature patches. Different features patches grids were used, ranging in spatial dimensions from 1×1 to 20×20.

Inventors trained Neural Networks with various architectures to classify the extracted dataset according to fixation times. The architectures Inventors explored were convolutional neural networks (CNNs) and fully connected neural networks (FCNN). The CNNs consisted of one or more convolutional layers with one or more subsequent fully connected layers.

When training FCNN, each features patch was spatially reduced to a feature vector using either a global max pooling layer or a global average pooling layer. When training CNNs, the convolutional layers operated directly on the input features patch. The networks were trained using a standard Cross Entropy Loss. Model performance was evaluated by measuring the F1 score of each validation fold and the best average F1 score across folds attained was ~0.7.

Inventors also evaluate an alternate pipeline where the WSI patches were fed directly into a customized CNN without prior feature extraction. The final layer was a classification layer with an output for each of the different fixation times. From each WSI, a region of interest (ROI) rectangle of 10,000-20,000 pixels to a side (×40 magnification) was selected for extraction, and patches were extracted in a grid covering the ROI 256×256 RGB patches. The patches were divided into a training set and a validation set, either based on the WSI slide or a random distribution of patches.

The loss function was standard Cross Entropy loss. The accuracy score for random patch selection was high (>95%), whereas it was significantly lower (<60%) when the validation/training split was done at the level of the WSI, corresponding to the results obtained using feature extraction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of training a preanalytical factor machine learning model, comprising:

creating a preanalytical training dataset of a plurality of records, wherein a preanalytical record comprises:

an image of a slide of pathological tissue of a subject processed with at least one preanalytical factor, and a ground truth label indicating the at least one preanalytical factor; and training the preanalytical machine learning model on the preanalytical training dataset for generating an outcome of at least one target preanalytical factor used to process tissue depicted in a target image in response to the input of the target image;

wherein the ground truth label indicating the at least one preanalytical factor comprises a ground truth label indicating correctly applied preanalytical factors or anomalous application of preanalytical factors, wherein training comprises training an implementation of the preanalytical machine learning model for learning a distribution of inlier images labelled as correctly applied preanalytical factors for detecting an image as an outlier indicating incorrectly applied preanalytical factors;

creating a secondary training dataset of a plurality of records, wherein a secondary record comprises:

the image of the slide of pathological tissue of the subject processed with the at least one preanalytical factor, the at least one preanalytical factor, and a ground truth label indicating a secondary indication; and training a secondary machine learning model on the secondary training dataset for generating an outcome of a target secondary indication in response to an input of a target image and at least one target preanalytical factor used to process tissue depicted in the target image, wherein the input of the at least one preanalytical factor fed into the secondary machine learning model is obtained as the outcome of the preanalytical machine learning model fed the target image, wherein the preanalytical machine learning model and the secondary machine learning model are jointly trained using at least common images and common labels of preanalytical factors;

wherein the at least one preanalytical factor of the secondary record comprises at least one feature map extracted from a hidden layer of the preanalytical machine learning model fed the image of the slide of pathological tissue of the subject processed with the at least one preanalytical factor, and wherein the secondary machine learning model generates the outcome of the target secondary indication in response to an input of the target image and a target feature map extracted from a hidden layer of the preanalytical machine learning model fed the target image.

2. The computer implemented method of claim 1, further comprising:

creating an image translation training dataset, comprising two or more sets of image translation records, wherein a source image translation record of a source set of image translation records comprises:

a source image of the slide of pathological tissue of the subject processed with the at least one preanalytical factor, and a ground truth indicating a source label, wherein a destination image translation record of a destination set of image translation records comprises:

a destination image of the slide of pathological tissue of the subject processed with the at least one preanalytical factor, and a ground truth indicating a destination label; and training an image translation machine learning model on the image translation training dataset for converting a target source image of a slide of pathological tissue of the source set of image translation records to an outcome destination of a slide of pathological tissue of the destination set of image translation records.

3. The computer implemented method of claim 2, wherein the source label indicates pathological tissue abnormally processed with the at least one preanalytical factor, and the destination label indicates pathological tissue normally processed with the at least one preanalytical factor, wherein the target source image comprises at least one of (i) an input image and additional metadata indicating a source preanalytical factor that has been abnormally processed, and metadata indicating a destination preanalytical factor that has been normally processed, and (ii) an input image and further comprising providing a reference image from the destination set used to infer the destination of the input image.

4. The computer implemented method of claim 2, wherein the source set is selected according to an input of the at least one preanalytical factor obtained as the outcome of the preanalytical machine learning model fed the target image.

5. The computer implemented method of claim 1, further comprising:

creating an image correction training dataset of a plurality of records, wherein an image correction record comprises:

the image of the slide of pathological tissue of the subject processed with the at least one preanalytical factor, wherein the at least one preanalytical factor is classified as abnormal, wherein the image of the slide depicts abnormally processed pathological tissue;

the at least one preanalytical factor, and a ground truth label indicating a normal image of a slide of pathological tissue processed with at least one preanalytical factor classified as normal; and training an image correction machine learning model on the image correction training dataset for generating an outcome of a synthesized corrected image of a slide of pathological tissue that simulates what a target image of the slide would look like when processed with the at least one preanalytical factor classified as normal, in response to the target image of the slide processed with at least one target preanalytical factor classified as abnormal, wherein the image correction machine learning model and the preanalytical machine learning model are jointly trained using common images and common ground truth labels of preanalytical factors.

6. The computer implemented method of claim 5, wherein the input of the at least one preanalytical factor fed into the image correction machine learning model is obtained as the outcome of the preanalytical machine learning model fed the target image.

7. The computer implemented method of claim 1, further comprising training a baseline model using a self-supervised and/or unsupervised approach on an unlabeled training dataset of a plurality of unlabeled images of pathological tissues of a subject processed with at least one preanalytical factor, and wherein training comprises further training the baseline model on the preanalytical training dataset for creating the preanalytical machine learning model.

8. The computer implemented method of claim 1, further comprising, for each preanalytical record, feeding the image into a nuclear segmentation machine learning model to obtain an outcome of a segmentation of nuclei in the image, creating a mask that masks out pixels external to the segmentation of the nuclei based on the outcome of the segmentation, and applying the mask to the image to create a masked image, wherein the image of the preanalytical record comprises the masked image, and wherein a target masked image created from the target image is fed into the preanalytical machine learning model trained on the preanalytical training dataset.

9. The computer implemented method of claim 1, further comprising, for each preanalytical record, feeding the image into a nuclear segmentation machine learning model to obtain an outcome of a segmentation of nuclei in the image, and cropping a boundary around each segmentation to create single-nucleus patches, wherein the image of the preanalytical record comprises a plurality of single-nucleus patches, and wherein a target segmentation of nuclei created from the target image is fed into the preanalytical machine learning model trained on the preanalytical training dataset.

10. The computer implemented method of claim 1, further comprising, for each preanalytical record, converting a color version of the image to a gray-scale version of the image, and wherein a target gray-scale version of the target image is fed into the preanalytical machine learning model trained on the preanalytical training dataset.

11. The computer implemented method of claim 1, further comprising, for each preanalytical record, feeding the image into a red blood cell (RBC) segmentation machine learning model to obtain an outcome of a segmentation of (RBC) in the image and/or patches that depict RBCs, wherein the image of the preanalytical record comprises the segmentations of RBC and/or patches that depict RBCs, and wherein a target segmentation of RBC and/or patches that depict RBC from the target image is fed into the preanalytical machine learning model trained on the preanalytical training dataset.

12. The computer implemented method of claim 1, wherein the preanalytical record further comprises metadata indicating at least one known preanalytical factor, and wherein the ground truth label is for at least one unknown preanalytical factor, wherein at least one known preanalytical factor associated with the target image is further fed into the preanalytical machine learning model trained on the preanalytical training dataset.

13. The computer implemented method of claim 1, further comprising training an interpretability machine learning model to generate an interpretability map indicating relative significance of pixels of the target image to obtaining the at least one target preanalytical factor, wherein the target image is at low resolution, and further comprising sampling a plurality of high resolution patches of the target image, and feeding the plurality of high resolution patches into the preanalytical machine learning model to obtain the at least one target preanalytical factor.

14. The computer implemented method of claim 1, wherein the at least one preanalytical factor is selected from a group consisting of: an indication of a quality of a stain of the pathological tissue of the slide, fixation time, tissue thickness obtained by sectioning of the FFPE block, fixative type, warm ischemic time, cold ischemic time, duration and delay of temperature during prefixation, fixative formula, fixative concentration, fixative pH, fixative age of reagent, fixative preparation source, tissue to fixative volume ratio, method of fixation, conditions of primary and secondary fixation, postfixation washing conditions and duration, post-fixation storage reagent and duration, type of processor, frequency of servicing and reagent replacement, tissue to reagent volume ratio, number of position of co-processed specimens, dehydration and clearing reagent, dehydration and clearing temperature, dehydration and clearing number of changes, dehydration clearing duration, baking time, and temperature.

15. The computer implemented method of claim 1, wherein the at least one preanalytical factor comprises a fixation time.

16. A computer implemented method of processing a target image of a slide of pathological tissue of a subject, comprising:

feeding the target image into a preanalytical machine learning model, wherein the preanalytical machine learning model is trained on a preanalytical training dataset of a plurality of records, where a preanalytical record comprises:

an image of a slide of pathological tissue of a subject processed with at least one preanalytical factor, and a ground truth label indicating the at least one preanalytical factor; and obtaining an outcome of at least one target preanalytical factor used to process the pathological tissue depicted in the target image;

wherein the ground truth label indicating the at least one preanalytical factor comprises a ground truth label indicating correctly applied preanalytical factors or anomalous application of preanalytical factors, wherein training comprises training an implementation of the preanalytical machine learning model for learning a distribution of inlier images labelled as correctly applied preanalytical factors for detecting an image as an outlier indicating incorrectly applied preanalytical factors;

feeding the target image and the at least one target preanalytical factor into a secondary machine learning model, wherein the secondary machine learning model is trained on a secondary indication training dataset of a plurality of records, wherein a secondary indication record comprises:

the image of the slide of pathological tissue of the subject processed with the at least one preanalytical factor, the at least one preanalytical factor, at least one feature map extracted from a hidden layer of the preanalytical machine learning model fed the target image, and a ground truth label indicating the secondary indication; and obtaining an outcome of a target secondary indication, in response to an input of the target image and a target feature map extracted from a hidden layer of the preanalytical machine learning model fed the target image;

in response to classifying the at least one target preanalytical factor as abnormal, further comprising at least one of:

i) feeding the target image and the at least one target preanalytical factor into an image correction machine learning model, wherein the image correction machine learning model is trained on a corrected image training dataset of a plurality of records, wherein an image correction record comprises:

the image of the slide of pathological tissue of the subject processed with the at least one preanalytical factor, wherein the at least one preanalytical factor is classified as abnormal, wherein the image of the slide depicts abnormally processed pathological tissue;

the at least one preanalytical factor, and a ground truth label indicating a normal image of a slide of pathological tissue processed with at least one preanalytical factor classified as normal; and obtaining an outcome of a corrected image that simulates what the target image of the slide would look like when processed with the at least one preanalytical factor classified as normal; and ii) feeding the target image and the at least one target preanalytical factor into an image translation machine learning model, wherein the image translation machine learning model is trained on an image translation training dataset, comprising two or more sets of image translation records, wherein a source image translation record of a source set of image translation records comprises:

a source image of the slide of pathological tissue of the subject processed with the at least one preanalytical factor, and a ground truth indicating a source label, wherein a destination image translation record of a destination set of image translation records comprises:

a destination image of the slide of pathological tissue of the subject processed with the at least one preanalytical factor, and a ground truth indicating a destination label; and obtaining an outcome destination image of a slide of pathological tissue of the destination set of image translation records that is a conversion of the abnormally processed target image into a normally processed image.

17. A device for obtaining at least one preanalytical factor of a target image of a slide of pathological tissue of a subject, comprising:

at least one hardware processor executing a code for:

feeding the target image into a preanalytical machine learning model, wherein the preanalytical machine learning model is trained on a preanalytical training dataset of a plurality of records, where a preanalytical record comprises:

an image of a slide of pathological tissue of a subject processed with at least one preanalytical factor, and a ground truth label indicating the at least one preanalytical factor; and obtaining an outcome of at least one target preanalytical factor used to process the pathological tissue depicted in the target image;

wherein the ground truth label indicating the at least one preanalytical factor comprises a ground truth label indicating correctly applied preanalytical factors or anomalous application of preanalytical factors, wherein training comprises training an implementation of the preanalytical machine learning model for learning a distribution of inlier images labelled as correctly applied preanalytical factors for detecting an image as an outlier indicating incorrectly applied preanalytical factors;

feeding the target image and the at least one target preanalytical factor into a secondary machine learning model, wherein the secondary machine learning model is trained on a secondary indication training dataset of a plurality of records, wherein a secondary indication record comprises:

the image of the slide of pathological tissue of the subject processed with the at least one preanalytical factor, the at least one preanalytical factor, at least one feature map extracted from a hidden layer of the preanalytical machine learning model fed the target image, and a ground truth label indicating the secondary indication; and obtaining an outcome of a target secondary indication, in response to an input of the target image and a target feature map extracted from a hidden layer of the preanalytical machine learning model fed the target image;

in response to classifying the at least one target preanalytical factor as abnormal, further comprising at least one of:

i) feeding the target image and the at least one target preanalytical factor into an image correction machine learning model, wherein the image correction machine learning model is trained on a corrected image training dataset of a plurality of records, wherein an image correction record comprises:

the image of the slide of pathological tissue of the subject processed with the at least one preanalytical factor, wherein the at least one preanalytical factor is classified as abnormal, wherein the image of the slide depicts abnormally processed pathological tissue;

the at least one preanalytical factor, and a ground truth label indicating a normal image of a slide of pathological tissue processed with at least one preanalytical factor classified as normal; and obtaining an outcome of a corrected image that simulates what the target image of the slide would look like when processed with the at least one preanalytical factor classified as normal; and ii) feeding the target image and the at least one target preanalytical factor into an image translation machine learning model, wherein the image translation machine learning model is trained on an image translation training dataset, comprising two or more sets of image translation records, wherein a source image translation record of a source set of image translation records comprises:

a source image of the slide of pathological tissue of the subject processed with the at least one preanalytical factor, and a ground truth indicating a source label, wherein a destination image translation record of a destination set of image translation records comprises:

a destination image of the slide of pathological tissue of the subject processed with the at least one preanalytical factor, and a ground truth indicating a destination label; and obtaining an outcome destination image of a slide of pathological tissue of the destination set of image translation records that is a conversion of the abnormally processed target image into a normally processed image.

18. A computer implemented method of training a preanalytical factor machine learning model, comprising:

creating a preanalytical training dataset of a plurality of records, wherein a preanalytical record comprises an image of a slide of pathological tissue of a subject processed with at least one preanalytical factor, and a ground truth label indicating the at least one preanalytical factor; and training the preanalytical machine learning model on the preanalytical training dataset for generating an outcome of at least one target preanalytical factor used to process tissue depicted in a target image in response to the input of the target image;

creating a secondary training dataset of a plurality of records, wherein a secondary record comprises:

the image of the slide of pathological tissue of the subject processed with the at least one preanalytical factor, the at least one preanalytical factor, and a ground truth label indicating a secondary indication; and training a secondary machine learning model on the secondary training dataset for generating an outcome of a target secondary indication in response to an input of a target image and at least one target preanalytical factor used to process tissue depicted in the target image;

wherein the input of the at least one preanalytical factor fed into the secondary machine learning model is obtained as the outcome of the preanalytical machine learning model fed the target image, and wherein the at least one preanalytical factor of the secondary record comprises at least one feature map extracted from a hidden layer of the preanalytical machine learning model fed the image of the slide of pathological tissue of the subject processed with the at least one preanalytical factor, and wherein the secondary machine learning model generates the outcome of the target secondary indication in response to an input of the target image and a target feature map extracted from a hidden layer of the preanalytical machine learning model fed the target image.

19. The computer implemented method of claim 18, wherein the at least one preanalytical factor comprises a fixation time, and additionally comprises a tissue thickness, or a warm ischemic time.

20. A computer implemented method of training an image correction machine learning model, comprising:

creating an image correction training dataset of a plurality of records, wherein an image correction record comprises the image of the slide of pathological tissue of the subject processed with the at least one preanalytical factor, wherein the at least one preanalytical factor is classified as abnormal, wherein the image of the slide depicts abnormally processed pathological tissue;

the at least one preanalytical factor, at least one feature map extracted from a hidden layer of a preanalytical machine learning model fed the target image, and a ground truth label indicating a normal image of a slide of pathological tissue processed with at least one preanalytical factor classified as normal; and training an image correction machine learning model on the image correction training dataset for generating an outcome of a synthesized corrected image of a slide of pathological tissue that simulates what a target image of the slide would look like when processed with the at least one preanalytical factor classified as normal, in response to the target image of the slide processed with at least one target preanalytical factor classified as abnormal;

wherein the at least one preanalytical factor comprises a fixation time, and additionally comprises a tissue thickness, or a warm ischemic time.

21. The computer implemented method of claim 20, wherein the at least one preanalytical factor further comprises a method of fixation.

22. A computer implemented method of training a preanalytical factor machine learning model, comprising:

creating a preanalytical training dataset of a plurality of records, wherein a preanalytical record comprises an image of a slide of pathological tissue of a subject processed with at least one preanalytical factor, and a ground truth label indicating the at least one preanalytical factor; and training the preanalytical machine learning model on the preanalytical training dataset for generating an outcome of at least one target preanalytical factor used to process tissue depicted in a target image in response to the input of the target image; and for each preanalytical record, feeding the image into a nuclear segmentation machine learning model to obtain an outcome of a segmentation of nuclei in the image, creating a mask that masks out pixels external to the segmentation of the nuclei based on the outcome of the segmentation, and applying the mask to the image to create a masked image, wherein the image of the preanalytical record comprises the masked image, and wherein a target masked image created from the target image is fed into the preanalytical machine learning model trained on the preanalytical training dataset;

wherein the nuclear segmentation machine learning model is trained using at least one feature map extracted from a hidden layer of the preanalytical machine learning model;

wherein the at least one preanalytical factor comprises a fixation time, and additionally comprises a tissue thickness, or a warm ischemic time.

* * * * *